US010687530B2

(12) United States Patent
Fevre et al.

(10) Patent No.: US 10,687,530 B2
(45) Date of Patent: *Jun. 23, 2020

(54) HYDROPHILIC POLYMERS WITH ANTIMICROBIAL FUNCTIONALITIES

(71) Applicants: International Business Machines Corporation, Armonk, NY (US); Agency for Science, Technology and Research, Connexis (SG)

(72) Inventors: Mareva B. Fevre, San Jose, CA (US); James L. Hedrick, Pleasanton, CA (US); Nathaniel H. Park, San Jose, CA (US); Victoria A. Piunova, Los Gatos, CA (US); Pang Kern Jeremy Tan, Singapore (SG); Yi Yan Yang, Singapore (SG); Mu San Zhang, San Francisco, CA (US)

(73) Assignees: INTERNATIONAL BUSINESS MACHINES CORPORATION, Armonk, NY (US); AGENCY FOR SCIENCE, TECHNOLOGY AND RESEARCH, Connexis (SG)

( * ) Notice: Subject to any disclaimer, the term of this patent is extended or adjusted under 35 U.S.C. 154(b) by 68 days.

This patent is subject to a terminal disclaimer.

(21) Appl. No.: 15/839,388

(22) Filed: Dec. 12, 2017

(65) Prior Publication Data
US 2019/0174755 A1    Jun. 13, 2019

(51) Int. Cl.
*A01N 37/18* (2006.01)
*C08G 69/40* (2006.01)
*A01N 33/12* (2006.01)
*A01N 43/50* (2006.01)
*C08L 101/00* (2006.01)

(52) U.S. Cl.
CPC ............. *A01N 37/18* (2013.01); *A01N 33/12* (2013.01); *A01N 43/50* (2013.01); *C08G 69/40* (2013.01); *C08L 101/00* (2013.01); *C08G 2230/00* (2013.01)

(58) Field of Classification Search
CPC ........ A01N 25/10; A01N 33/12; A01N 43/50; C09D 17/001; C09D 17/002
See application file for complete search history.

(56) References Cited

U.S. PATENT DOCUMENTS

| 3,632,623 | A | 1/1972 | Becke et al. |
| 4,013,507 | A | 3/1977 | Rembaum |
| 4,032,596 | A | 6/1977 | Uffner et al. |
| 4,094,827 | A | 6/1978 | McEntire |
| 4,166,894 | A | 9/1979 | Schaper |
| 4,348,536 | A | 9/1982 | Blahak et al. |
| 4,698,391 | A | 10/1987 | Yacobucci et al. |
| 4,794,031 | A | 12/1988 | Leir et al. |
| 4,883,655 | A | 11/1989 | Login et al. |
| 5,419,897 | A | 5/1995 | Drake et al. |
| 5,681,862 | A | 10/1997 | Hollis et al. |
| 6,767,549 | B2 | 7/2004 | Mandeville, III et al. |
| 6,955,806 | B2 | 10/2005 | Fitzpatrick et al. |
| 8,541,477 | B2 | 9/2013 | Alabdulrahman et al. |
| 2006/0002889 | A1 | 1/2006 | Fitzpatrick |
| 2007/0025954 | A1 | 2/2007 | Fitzpatrick et al. |
| 2007/0106061 | A1 | 5/2007 | Zollinger et al. |
| 2012/0202979 | A1 | 8/2012 | Wu |
| 2013/0281515 | A1 | 10/2013 | Coady et al. |
| 2014/0275469 | A1 | 9/2014 | Dhal et al. |
| 2015/0038392 | A1 | 2/2015 | Scheuing et al. |
| 2016/0374335 | A1 | 12/2016 | Chan et al. |
| 2016/0375150 | A1 | 12/2016 | Wu |

FOREIGN PATENT DOCUMENTS

| CN | 1192649 A | 9/1998 |
| CN | 1254334 A | 5/2000 |
| CN | 1518621 A | 8/2004 |
| CN | 101426507 A | 5/2009 |
| CN | 101646728 A | 2/2010 |
| CN | 105482105 A | 4/2016 |
| GB | 2 000 164 A | * 1/1979 |
| JP | H103255139 A | 11/1991 |
| JP | 2004-224734 A | 8/2004 |
| JP | 2008214529 A | 9/2008 |

(Continued)

OTHER PUBLICATIONS

Murakami et al. (Journal of the Chemical Society Perkin Transactions 1: Organic and Bio-Organic Chemistry, pp. 2800-2808, Issue 11, Published 1982). (Year: 1981).*
Liu, et al., Highly potent antimicrobial polyionenes with rapid killing kinetics, skin biocompatibility and in vivo bactericidal activity, Biomaterials, 2017, pp. 36-48, vol. 127.
Williams, et al., Recent advances in the synthesis and structure—property relationships of ammonium ionenes, Progress in Polymer Science, 2009, pp. 762-782, vol. 34.
Narita, et al., Effects of charge density and hydrophobicity of ionene polymer on cell binding and viability, Colloid Polym. Sci, 2000, pp. 884-887.
Mattheis, et al., Closing One of the Last Gaps in Polyionene Compositions: Alkyloxyethylammonium Ionenes as Fast-Acting Biocides, Macromolecular Bioscience, 2012, pp. 341-349, vol. 12.

(Continued)

*Primary Examiner* — Alma Pipic
(74) *Attorney, Agent, or Firm* — Amin, Turocy & Watson, LLP

(57) ABSTRACT

Techniques regarding ionene and/or polyionene compositions with antimicrobial functionality and enhanced hydrophilicity are provided. For example, one or more embodiments can regard a chemical compound that can comprise an ionene unit, which can comprise a cation distributed along a degradable backbone. The degradable backbone can comprise a terephthalamide structure. The ionene unit can have antimicrobial functionality. Further, the chemical compound can comprise a hydrophilic functional group covalently bonded to the ionene unit. Also, the chemical compound can have carbohydrate mimetic functionality.

5 Claims, 11 Drawing Sheets

(56) References Cited

FOREIGN PATENT DOCUMENTS

| WO | 97/02744 A1 | 1/1997 |
|---|---|---|
| WO | 98/54140 A1 | 12/1998 |
| WO | 02/080939 A2 | 10/2002 |
| WO | 02/099192 A2 | 12/2002 |
| WO | 2016/178634 A1 | 11/2016 |
| WO | 2016/186581 A1 | 11/2016 |
| WO | 2016/209732 A1 | 12/2016 |

OTHER PUBLICATIONS

Strassburg, et al., Nontoxic, Hydrophilic Cationic Polymers—Identified as Class of Antimicrobial Polymers, Macromolecular Bioscience, 2015, pp. 1710-1723, vol. 15.

Mayr, et al., Antimicrobial and Hemolytic Studies of a Series of Polycations Bearing Quaternary Ammonium Moieties: Structural and Topological Effects, International Journal of Molecular Sciences, 2017, 8 pages, vol. 18, No. 303.

Tamami, Synthesis and Characterization of Ammonium Ionenes Containing Hydrogen Bonding Functionalities, Dec. 6, 2012, 108 pages, Virginia Polytechnic Institute and State University.

Brown et al., The Structure Activity Relationship of Urea Derivatives as Anti-Tuberculosis Agents, Bioorg Med Chem. Sep. 15, 2011, pp. 5585-5595 vol. 19, No. 18.

Williams, Influence of Electrostatic Interactions and Hydrogen Bonding on the Thermal and Mechanical Properties of Step-Growth Polymers, Oct. 21, 2008, 375 pages, Virginia Polytechnic Institute and State University.

International Search Report and Written Opinion received for PCT Application Serial No. PCT/IB2018/059622, dated Mar. 28, 2019, 9 pages.

International Search Report and Written Opinion received for PCT Application Serial No. PCT/IB2018/059626, dated Apr. 15, 2019, 8 pages.

International Search Report and Written Opinion received for PCT Application Serial No. PCT/IB2018/059620, dated Mar. 27, 2019, 11 pages.

International Search Report and Written Opinion received for PCT Application Serial No. PCT/IB2018/059624 dated Apr. 17, 2019, 8 pages.

Non-Final Office Action received for U.S. Appl. No. 15/839,415 dated Jul. 10, 2019, 29 pages.

International Search Report and Written Opinion received for PCT Application Serial No. PCT/IB2018/059621 dated Apr. 10, 2019, 8 pages.

Non-Final Office Action received for U.S. Appl. No. 15/839,199 dated Jun. 26, 2019, 66 pages.

Tiecco et al., "Biocidal and inhibitory activity screening of de novo synthesized surfactants against two eukaryotic and two prokaryotic microbial species", Science Direct, Colloids and Surfaces B: Biointerfaces, vol. 111, Nov. 1, 2013, 35 pages.

Non-Final Office Action received for U.S. Appl. No. 15/839,402 dated Jun. 26, 2019, 56 pages.

Odagi et al., "Origin of Stereocontrol in Guanidine-Bisurea Bifunctional Organocatalyst That Promotes α-Hydroxylation of Tetralone-Derived β-Ketoesters: Asymmetric Synthesis of β- and γ-Substituted Tetralone Derivatives via Organocatalytic Oxidative Kinetic Resolution", Journal of the American Chemical Society, Jan. 2015, pp. 1909-1915.

Magri et al., "Rethinking the old antiviral drug moroxydine: Discovery of novel analogues as anti-hepatitis C virus (HCV) agents", Bioorganic and Medicinal Chemistry Letters, vol. 25, No. 22, Nov. 2015, pp. 5372-5376.

Advisory Action received for U.S. Appl. No. 15/839,199, dated Nov. 19, 2019, 16 pages.

Non-Final Office Action received for U.S. Appl. No. 15/839,199 dated Dec. 26, 2019, 156 pages.

Haque et al., Synthesis, Characterization, and Crystal Structures of Bis-Imidazolium Salts and Respective Dinuclear Ag(I) N-Heterocyclic Carbene Complexes: In Vitro Anticancer Studies against "Human Colon Cancer" and "Breast cancer", Hindawi Publishing Corporation Journal of Chemistry, 2013, 11 pages.

Wynne et al., "Synthesis and Development of a Multifunctional Self-Decontaminating Polyurethane Coating", Applied Materials and Interfaces, 2011, pp. 2005-2011.

Oi'Khovik et al., "Synthesis, Antimicrobial and Antifungal Activity of Double Quaternary Alnmonium Salts of Biphenyls", Russian Journal of General Chemistry, vol. 83, No. 2, 2013, pp. 329-335.

Jones et al., ortlo Substitution Rearrangement vs. β)—Elimination of Quaternary Ammonium Ion-Alcohols and Methyl Ether with Excess Sodium Amide[1], vol. 27 ,1962, pp. 806-814.

Menger et al., "Synthesis and Properties of Nine New Polyhydroxylated Surfactants", Langmuir, vol. 12, No. 6, 1996, pp. 1471-1473.

Final Office Action received for U.S. Appl. No. 15/839,397 dated Dec. 16, 2019, 31 pages.

Shen et al., "Synthesis of Highly Ordered Thermally Stable Cubic Mesostructured Zirconium Oxophosphate Templated by Tri-Headgroup Quaternary Ammonium Surfactants", Chem. Mater, 2003, pp. 4046-4051.

Wang et al., "Transfection and structural properties of phytanyl substituted gemini surfactant-based vectors for gene delivery", Phys. Chem. Chem. Phys., 2013, pp. 20510-20516.

Final Office Action received for U.S. Appl. No. 15/839,199 dated Sep. 26, 2019, 25 pages.

Non-Final Office Action received for U.S. Appl. No. 15/839,270 dated Sep. 16, 2019, 70 pages.

Non-Final Office Action received for U.S. Appl. No. 15/839,397 dated Sep. 17, 2019, 47 pages.

Wettig et al., "Thermodynamic and aggregation properties of aza- and imino-substituted gemini surfactants designed for gene delivery", Physical Chemistry Chemical Physics, vol. 9, 2007, pp. 871-877.

Notice of Allowance received for U.S. Appl. No. 15/839,402 dated Oct. 24, 2019, 113 pages.

Chahboune et al., "Application of liquid chromatography/electrospray ionization tandem mass spectrometry for the elucidation of hydroxyl radical oxidation of metsulfuron methyl and related sulfonylurea pesticide products: evidence for the triazine skeleton scission", Rapid Communications in Mass Spectrometry, vol. 29, Sep. 2015, pp. 1370-1380.

Rafqah et al., "Kinetics and mechanism of the degradation of the pesticde metsulfuron methyl induced by excitation pf iron(III) aqua complexes in aqueous solutions: steady state and transient absorption spectroscopy studies", Photochem. Photobial. Sci., vol. 3, 2004, pp. 296-304.

Si et al., "Leaching and degradation of ethametsulfuron-methyl in soil", Cehmosphere, vol. 60, 2005, pp. 601-609.

Li-Feng et al., "Biodegradation of Ethametsulfuron-Methyl by *Pseudomonas* sp. SW4 Isolated from Contaminated Soil", Curr Microbial, vol. 55, 2007, pp. 420-426.

Non-Final Office Action received for U.S. Appl. No. 15/839,410 dated Oct. 31, 2019, 41 pages.

Final Office Action received for U.S. Appl. No. 15/839,415 dated Nov. 6, 2019, 29 pages.

Non-Final Office Action received for U.S. Appl. No. 15/839,410 dated Apr. 22, 2020, 38 pages.

* cited by examiner

702 — DISSOLVING AN AMINE MONOMER, A HYDROPHILIC BLOCK POLYMER, AND AN ELECTROPHILE IN A SOLVENT, THE AMINE MONOMER COMPRISING A DEGRADABLE BACKBONE, AND THE DEGRADABLE BACKBONE COMPRISING A TEREPTHALAMIDE STRUCTURE

704 — POLYMERIZING THE AMINE MONOMER, THE HYDROPHILIC BLOCK POLYMER, AND THE ELECTROPHILE TO FORM A HYDROPHILIC CHEMICAL COMPOUND, THE HYDROPHILIC CHEMICAL COMPOUND COMPRISING A CATION DISTRIBUTED ALONG THE DEGRADABLE BACKBONE, WHEREIN THE HYDROPHILIC CHEMICAL COMPOUND HAS ANTIMICROBIAL FUNCTIONALITY

| Polymer Composition | SA (µg/mL) | EC (µg/mL) | PA (µg/mL) | CA (µg/mL) | Hemolysis (µg/mL) |
|---|---|---|---|---|---|
| First Polymer Composition 404 | 8 | 16 | 31 | 8 | >2000 |
| Second Polymer Composition 408 | 4 | 8 | 4 | 8 | >2000 |
| Third Polymer Composition 502 | >500 | >500 | >500 | >500 | >2000 |
| Fourth Polymer Composition 802 | 4 | 8 | 8 | 16 | >2000 |
| Fifth Polymer Composition 806 | 8 | 8 | 8 | 8 | >2000 |

CONTACTING A PATHOGEN WITH A CHEMICAL COMPOUND, THE CHEMICAL COMPOUND COMPRISING: AN IONENE UNIT COMPRISING A CATION DISTRIBUTED ALONG A DEGRADABLE BACKBONE, THE DEGRADABLE BACKBONE COMPRISING A TEREPTHALAMIDE STRUCTURE, WHEREIN THE IONENE UNIT HAS ANTIMICROBIAL FUNCTIONALITY; AND A HYDROPHILIC FUNCTIONAL GROUP COVALENTLY BONDED TO THE IONENE UNIT — 1102

ELECTROSTATICALLY DISRUPTING A MEMBRANE OF THE PATHOGEN UPON CONTACTING THE PATHOGEN WITH THE CHEMICAL COMPOUND — 1104

HYDROPHILIC POLYMERS WITH ANTIMICROBIAL FUNCTIONALITIES

BACKGROUND

The subject disclosure relates to one or more polymers with antimicrobial functionalities, and more specifically, to one or more ionenes and/or polyionenes with enhanced hydrophilicity and comprising cations and/or hydrophobic functional groups distributed along a degradable backbone.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, methods and/or compositions regarding hydrophilic ionenes and/or polyionenes with antimicrobial functionality are described.

According to an embodiment, a chemical compound is provided. The chemical compound can comprise an ionene unit that can comprise a cation distributed along a degradable backbone. The degradable backbone can comprise a terephthalamide structure. The ionene unit can have antimicrobial functionality. Further, the chemical compound can comprise a hydrophilic functional group covalently bonded to the ionene unit. Also, the chemical compound can have carbohydrate mimetic functionality.

According to an embodiment, a chemical compound is provided. The chemical compound can comprise an ionene unit that can comprise a cation distributed along a degradable backbone. The degradable backbone can comprise a terephthalamide structure. The ionene unit can have antimicrobial functionality. Further, the chemical compound can comprise a hydrophilic functional group covalently bonded to the ionene unit. Also, the hydrophilic functional group can be derived from a block polymer.

According to another embodiment, a method is provided. The method can comprise dissolving an amine monomer, a hydrophilic polyol, and an electrophile in a solvent. The amine monomer can comprise a degradable backbone that can comprise a terepthalamide structure. The method can also comprise polymerizing the amine monomer, the hydrophilic polyol, and the electrophile to form a hydrophilic chemical compound. The hydrophilic chemical compound can comprise a cation distributed along the degradable backbone and can have antimicrobial functionality.

According to another embodiment, a method is provided. The method can comprise dissolving an amine monomer, a hydrophilic block polymer, and an electrophile in a solvent. The amine monomer can comprise a degradable backbone that can comprise a terepthalamide structure. The method can also comprise polymerizing the amine monomer, the hydrophilic block polymer, and the electrophile to form a hydrophilic chemical compound. The hydrophilic chemical compound can comprise a cation distributed along the degradable backbone and can have antimicrobial functionality.

According to another embodiment, a method is provided. The method can comprise contacting a pathogen with a chemical compound. The chemical compound can comprise an ionene unit that can comprise a cation distributed along a degradable backbone. The degradable backbone can comprise a terephthalamide structure. The ionene unit can have antimicrobial functionality. Further, the chemical compound can comprise a hydrophilic functional group covalently bonded to the ionene unit. Also, the contacting the pathogen with the chemical compound can electrostatically disrupt a membrane of the pathogen.

BRIEF DESCRIPTION OF THE DRAWINGS

FIG. 7 illustrates a flow diagram of an example, non-limiting method that can facilitate generating one or more ionene and/or polyionene compositions in accordance with one or more embodiments described herein.

FIG. 9 illustrates a diagram of an example, non-limiting chart that can depict antimicrobial functionality of one or more polymer compositions in accordance with one or more embodiments described herein.

FIG. 11 illustrates a flow diagram of an example, non-limiting method that can facilitate killing a pathogen with one or more ionene and/or polyionene compositions in accordance with one or more embodiments described herein.

DETAILED DESCRIPTION

Figure 1A:
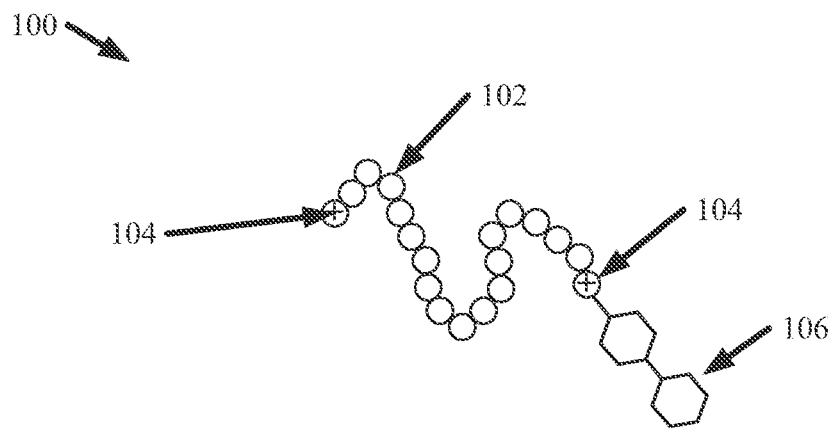
FIG. 1A illustrates a diagram of an example, non-limiting ionene unit in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

The discovery and refinement of antibiotics was one of the crowning achievements in the 20$^{th}$ century that revolutionized healthcare treatment. For example, antibiotics such as penicillin, ciprofloxacin and, doxycycline can achieve microbial selectivity through targeting and disruption of a specific prokaryotic metabolism, while concurrently, remaining benign toward eukaryotic cells to afford high selectivity. If properly dosed, they could eradicate infection. Unfortunately, this therapeutic specificity of antibiotics also leads to their undoing as under-dosing (incomplete kill) allows for minor mutative changes that mitigate the effect of the antibiotic leading to resistance development. Consequently, nosocomial infections, caused by medication-resistant microbes such as methicillin-resistant *Staphylococcus aureus* (MRSA), multi-medication-resistant *Pseudomonas aeruginosa* and vancomycin-resistant Enterococci (VRE) have become more prevalent. An added complexity is the pervasive use of antimicrobial agents in self-care products, sanitizers and hospital cleaners etc, including anilide, bisphenols, biguanides and quaternary ammonium compounds, where a major concern is the development of cross- and co-resistance with clinically used antibiotics, especially in a hospital setting. Another unfortunate feature with triclosan, for example, is its cumulative and persistent effects in the skin. Moreover, biofilms have been associated with numerous nosocomial infections and implant failure, yet the eradication of biofilms is an unmet challenge to this date. Since antibiotics are not able to penetrate through extracellular polymeric substance that encapsulates bacteria in the biofilm, further complexities exist that lead to the development of medication resistance.

However, polymers having a cationic charge can provide electrostatic disruption of the bacterial membrane interaction. Furthermore, cationic polymers are readily made amphiphilic with addition of hydrophobic regions permitting both membrane association and integration/lysis. The amphiphilic balance has shown to play an important effect not only in the antimicrobial properties but also in the hemolytic activity. Many of these antimicrobial polymers show relatively low selectivity as defined by the relative toxicity to mammalian cells or hemolysis relative to pathogens.

The various embodiments described herein can regard one or more chemical compounds (e.g., ionene compositions, polyionene compositions, monomers, and/or polymers) with antimicrobial functionality and enhanced hydrophilicity. Hydrophilicity enhancement can be preferred for applications such as skin infections and agriculture. For example, hydrophilicity can be significant regarding antimicrobial mobility in plants. For instance, low molecular weight carbohydrates can show high mobility with plants.

As used herein, the term "ionene" can refer to a polymer unit, a copolymer unit, and/or a monomer unit that can comprise a nitrogen cation and/or a phosphorus cation distributed along, and/or located within, a molecular backbone, thereby providing a positive charge. Example nitrogen cations include, but are not limited to: quaternary ammonium cations, protonated secondary amine cations, protonated tertiary amine cations, and/or imidazolium cations. Example, phosphorus cations include, but are not limited to: quaternary phosphonium cations, protonated secondary phosphine cations, and protonated tertiary phosphine cations. As used herein, the term "molecular backbone" can refer to a central chain of covalently bonded atoms that form the primary structure of a molecule. In various embodiments described herein, side chains can be formed by bonding one or more functional groups to a molecular backbone. As used herein, the term "polyionene" can refer to a polymer that can comprise a plurality of ionenes. For example, a polyionene can comprise a repeating ionene.

FIG. 1A illustrates a diagram of an example, non-limiting ionene unit 100 in accordance with one or more embodiments described herein. The ionene unit 100 can comprise a molecular backbone 102, one or more cations 104, and/or one or more hydrophobic functional groups 106. In various embodiments, an ionene and/or a polyionene described herein can comprise the ionene unit 100. For example, a polyionene described herein can comprise a plurality of ionenes bonded together, wherein the bonded ionenes can have a composition exemplified by ionene unit 100.

Figure 1B:
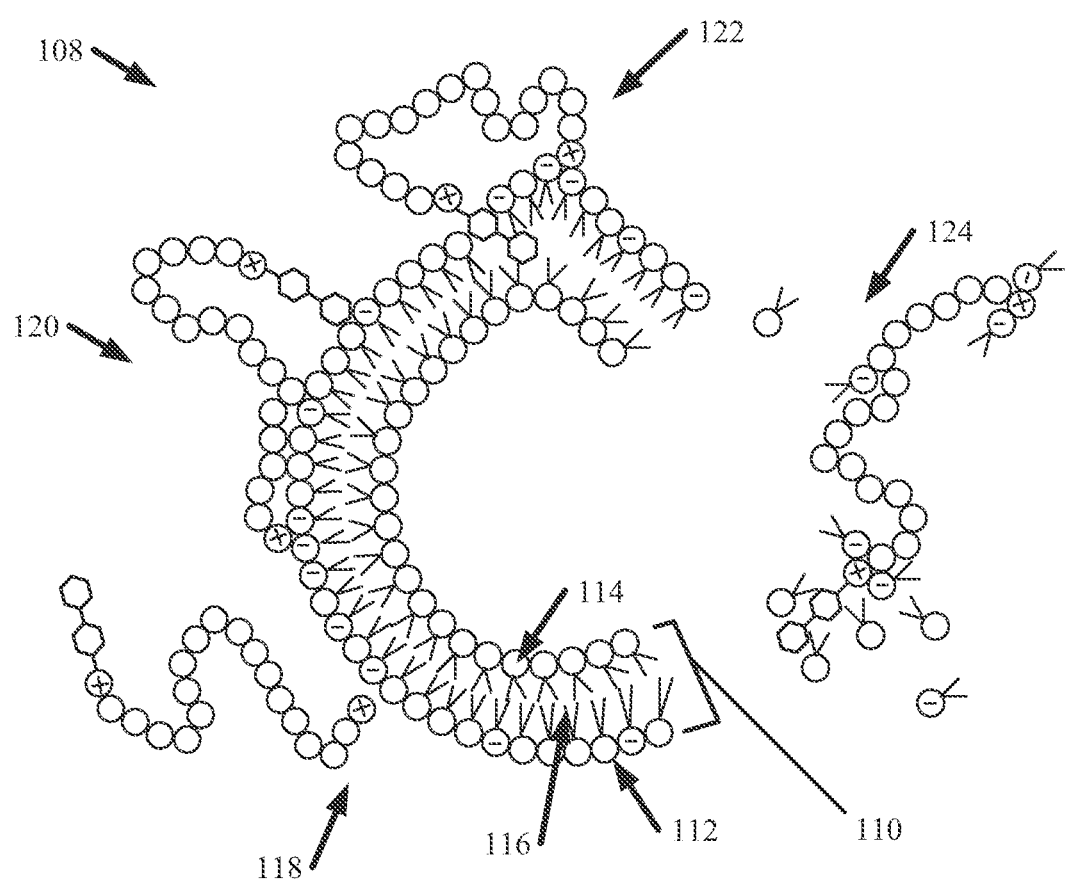
FIG. 1B illustrates a diagram of an example, non-limiting lysis process that can be performed by one or more ionene units in accordance with one or more embodiments described herein.

The molecular backbone 102 can comprise a plurality of covalently bonded atoms (illustrated as circles in FIGS. 1A and 1B). The atoms can be bonded in any desirable formation, including, but not limited to: chain formations, ring formations, and/or a combination thereof. The molecular backbone 102 can comprise one or more chemical structures including, but not limited to: alkyl structures, aryl structures, alkane structures, aldehyde structures, ester structures, carboxyl structures, carbonyl structures, amine structures, amide structures, phosphide structures, phosphine structures, a combination thereof, and/or the like. One of ordinary skill in the art will recognize that the number of atoms that can comprise the molecular backbone can vary depending of the desired function of the ionene unit 100. For example, while nineteen atoms are illustrated in FIG. 1A, a molecular backbone 102 that can comprise dozens, hundreds, and/or thousands of atoms is also envisaged.

Located within the molecular backbone 102 are one or more cations 104. As described above, the one or more cations 104 can comprise nitrogen cations and/or phosphorous cations. The cations 104 can be distributed along the molecular backbone 102, covalently bonded to other atoms within the molecular backbone 102. In various embodiments, the one or more cations 104 can comprise at least a portion of the molecular backbone 102. One of ordinary skill in the art will recognize that the number of a cations 104 that can comprise the ionene unit 100 can vary depending of the desired function of the ionene unit 100. For example, while two cations 104 are illustrated in FIG. 1A, an ionene unit 100 that can comprise dozens, hundreds, and/or thousands of cations 104 is also envisaged. Further, while FIG. 1A illustrates a plurality of cations 104 evenly spaced apart, other configurations wherein the cations 104 are not evenly spaced apart are also envisaged. Also, the one or more cations 104 can be located at respective ends of the molecular backbone 102 and/or at intermediate portions of the molecular backbone 102, between two or more ends of the molecular backbone 102. The one or more cations 104 can provide a positive charge to one or more locations of the ionene unit 100.

The one or more hydrophobic functional groups 106 can be bonded to the molecular backbone 102 to form a side chain. The one or more of the hydrophobic functional groups 106 can be attached to the molecular backbone 102 via bonding with a cation 104. Additionally, one or more hydrophobic functional groups 106 can be bonded to an electrically neutral atom of the molecular backbone 102. The ionene unit 100 can comprise one or more hydrophobic functional groups 106 bonded to: one or more ends of the molecular backbone 102, all ends of the molecular backbone 102, an intermediate portion (e.g., a portion between two ends) of the molecular backbone 102, and/or a combination thereof.

While a biphenyl group is illustrated in FIG. 1A as the hydrophobic functional group 106, other functional groups that are hydrophobic are also envisaged. Example, hydrophobic functional groups 106 include, but are not limited to: alkyl structures, aryl structures, alkane structures, aldehyde structures, ester structures, carboxyl structures, carbonyl structures, carbonate structures, alcohol structures, a combination thereof, and/or the like. In various embodiments, the one or more hydrophobic functional groups 106 can comprise the same structure. In other embodiments, one or more of the hydrophobic functional groups 106 can comprise a first structure and one or more other hydrophobic functional groups 106 can comprise another structure.

FIG. 1B illustrates a diagram of an example, non-limiting lysis process 108 that can be facilitated by the ionene unit 100 in accordance with one or more embodiments described herein. Repetitive description of like elements employed in other embodiments described herein is omitted for sake of brevity. The lysis process 108 can comprise a plurality of stages that can collectively comprise an attack mechanism that can be performed by the ionene unit 100 against a pathogen cell. Example pathogen cells include, but are not limited to: Gram-positive bacteria cells, Gram-negative bacteria cells, fungi cells, and/or yeast cells.

The target pathogen cell can comprise a membrane having a phospholipid bilayer 110. In various embodiments, the membrane can be an extracellular matrix. The phospholipid bilayer 110 can comprise a plurality of membrane molecules 112 covalently bonded together, and the membrane molecules 112 can comprise a hydrophilic head 114 and one or more hydrophobic tails 116. Further, one or more of the plurality of membrane molecules 112 can be negatively charged (as illustrated in FIG. 1B with a "−" symbol).

At 118, electrostatic interaction can occur between the positively charged cations 104 of the ionene unit 100 and one or more negatively charged membrane molecules 112. For example, the negative charge of one or more membrane molecules 112 can attract the ionene unit 100 towards the membrane (e.g., the phospholipid bilayer 110). Also, the electrostatic interaction can electrostatically disrupt the integrity of the membrane (e.g., phospholipid bilayer 110). Once the ionene unit 100 has been attracted to the membrane (e.g., phospholipid bilayer 110), hydrophobic membrane integration can occur at 120. For example, at 120 one or more hydrophobic functional groups 106 of the ionene unit 100 can begin to integrate themselves into the phospholipid bilayer 110. While the positively charged portions of the ionene unit 100 are attracted, and electrostatically disrupting, one or more negatively charged membrane molecules 112 (e.g., one or more hydrophilic heads 114), the one or more hydrophobic functional groups 106 can insert themselves between the hydrophilic heads 114 to enter a hydrophobic region created by the plurality of hydrophobic tails 116.

As a result of the mechanisms occurring at 118 and/or 120, destabilization of the membrane (e.g., the phospholipid bilayer 110) can occur at 122. For example, the one or more hydrophobic functional groups 106 can serve to cleave one or more negatively charged membrane molecules 112 from adjacent membrane molecules 112, and the positively charged ionene unit 100 can move the cleaved membrane segment (e.g., that can comprise one or more negatively charged membrane molecules 112 and/or one or more neutral membrane molecules 112 constituting a layer of the phospholipid bilayer 110) away from adjacent segments of the membrane (e.g., adjacent segments of the phospholipid bilayer 110). As cleaved segments of the membrane (e.g., the phospholipid bilayer 110) are pulled away, they can fully detach from other membrane molecules 112 at 124, thereby forming gaps in the membrane (e.g., the phospholipid bilayer 110). The formed gaps can contribute to lysis of the subject pathogen cell. In various embodiments, a plurality of ionene units 100 can perform the lysis process 108 on a cell simultaneously. Furthermore, the ionene units 100 participating in a lysis process 108 need not perform the same stages of the attack mechanism at the same time.

Figure 2:
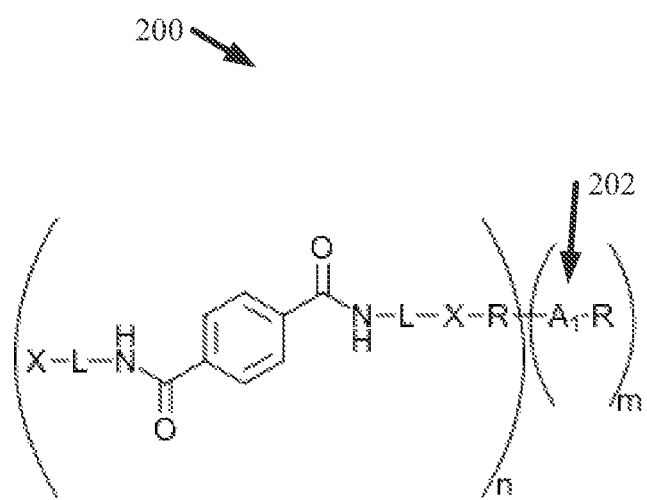
FIG. 2 illustrates a diagram of an example, non-limiting chemical formula that can characterize one or more ionene units in accordance with one or more embodiments described herein.

FIG. 2 illustrates a diagram of an example, non-limiting chemical formula 200 that can characterize the structure of an ionene unit 100 in accordance with one or more embodiments described herein. Repetitive description of like elements employed in other embodiments described herein is omitted for sake of brevity. In one or more embodiments, the ionene unit 100 characterized by chemical formula 200 can form a monomer. In various embodiments, a plurality of ionene units 100 characterized by chemical formula 200 can be covalently bond together to form a polymer (e.g., an alternating copolymer and/or a random copolymer).

As shown in FIG. 2, an ionene unit 100 characterized by chemical formula 200 can comprise a degradable molecular backbone 102. Further, the degradable molecular backbone 102 can comprise one or more terephthalamide structures. In various embodiments, the ionene unit 100 characterized by chemical formula 200 can be derived from polyethylene terephthalate (PET), wherein the one or more terephthalamide structures can be derived from the PET. However, one or more embodiments of chemical formula 200 can comprise a degradable a terephthalamide structure derived from one or more molecules other than PET.

The "X" in FIG. 2 can represent the one or more cations 104. For example, "X" can represent one or more cations 104 selected from a group that can include, but is not limited to: one or more nitrogen cations, one or more phosphorus cations, and/or a combination thereof. For instance, "X" can represent one or more nitrogen cations selected from a group that can include, but is not limited to: one or more protonated secondary amine cations, one or more protonated tertiary amine cations, one or more quaternary ammonium cations, one or more imidazolium cations, and/or a combination thereof. In another instance, "X" can represent one or more phosphorus cations selected from a group that can include, but is not limited to: one or more protonated secondary phosphine cations, one or more protonated tertiary phosphine cations, one or more quaternary phosphonium cations, and/or a combination thereof.

The one or more cations 104 (e.g., represented by "X" in chemical formula 200) can be covalently bonded to one or more linkage groups to form, at least a portion, of the degradable molecular backbone 102. The one or more linkage groups can link the one or more cations 104 to the one or more terephthalamide structures, thereby comprising the molecular backbone 102. The "L" in FIG. 2 can represent the one or more linkage groups. The one or more linkage groups can comprise any structure in compliance with the various features of the molecular backbone 102 described herein. For example, the one or more linkage groups can have any desirable formation, including, but not limited to: chain formations, ring formations, and/or a combination thereof. The one or more linkage groups can comprise one or more chemical structures including, but not limited to: alkyl structures, aryl structures, alkane structures, aldehyde structures, ester structures, carboxyl structures, carbonyl structures, a combination thereof, and/or the like. For instance, "L" can represent one or more linkage groups that can comprise an alkyl chain having greater than or equal to two carbon atoms and less than or equal to 15 carbon atoms.

As shown in FIG. 2, in various embodiments, an ionene unit 100 characterized by chemical formula 200 can comprise cations 104 (e.g., represented by "X") at a plurality of locations along the molecular backbone 102. For example, cations 104 can be located at either end of the molecular backbone 102 (e.g., as illustrated in FIG. 2). However, in one or more embodiments of chemical formula 200, the molecular backbone 102 can comprise less or more cations 104 than the two illustrated in FIG. 2.

Further, the "R" shown in FIG. 2 can represent the one or more hydrophobic functional groups 106 in accordance with the various embodiments described herein. For example, the one or more hydrophobic functional groups 106 can comprise one or more alkyl groups and/or one or more aryl groups. For instance, the hydrophobic functional group 106 can be derived from one or more dialkyl halides. The one or more hydrophobic functional groups 106 (e.g., represented by "R" in FIG. 2) can be covalently bonded to one or more of the cations 104 (e.g., represented by "X" in FIG. 2) and/or the molecular backbone 102, which can comprise the one or more cations 104 (e.g., represented by "X" in FIG. 2), one or more linkage groups (e.g., represented by "L" in FIG. 2), and/or one or more terepthalamide structures.

Further, the ionene unit 100 (e.g., characterized by chemical formula 200) can comprise one or more hydrophilic functional groups 202. For example, the one or more hydrophobic functional groups 106 can be covalently bonded to one or more hydrophilic functional groups 202. As shown in FIG. 2, "$A_1$" can represent the one or more hydrophilic functional groups 202. The one or more hydrophilic functional groups 202 can be bonded to a hydrophobic functional group 106 that is bonded to the molecular backbone 102 of the ionene unit 100 (e.g., a hydrophobic functional group 106 bonded to a cation 104). Additionally, as shown in FIG. 2, a hydrophilic functional group 202 can be bonded to two or more hydrophobic functional groups 106: a first hydrophobic functional group 106 bonded to the molecular backbone 102 of the ionene unit 100 (e.g., a hydrophobic functional group 106 bonded to a cation 104); and one or more additional hydrophobic functional groups 106 that are not directly bonded to the molecular backbone 102 of the subject ionene unit 100. In various embodiments, one or more of the additional hydrophobic functional group 106 can be bonded to another ionene unit 100. Moreover, one or more hydrophilic functional groups 202 can be bonded directly to the molecular backbone 102, rather than via a hydrophobic functional group 106.

The one or more hydrophilic functional groups 202 (e.g., represented by "$A_1$") can be derived from one or more polyols. Thus, the one or more hydrophilic functional groups 202 can comprise a plurality of hydroxyl groups, which can render carbohydrate mimetic functionality to the ionene unit 100. In other words, the one or more hydrophilic functional groups 202 can contribute a plurality of hydroxyl groups to the composition of an ionene unit 100, thereby giving the ionene unit 100 carbohydrate mimetic functionality (e.g., functionality similar to that of a carbohydrate). For example, the one or more hydrophilic functional groups 202 can increase the subject ionene unit's 100 antimicrobial mobility (e.g., similar to the mobility exhibited by carbohydrates in plants). Further, one or more of the hydrophilic functional groups 202 can comprise one or more carboxyl groups, one or more carbonyl groups, one or more ether groups, one or more ketone groups, a combination thereof, and/or the like.

Additionally, the one or more hydrophilic functional groups 202 (e.g., represented by "$A_1$" in FIG. 2) can comprise one or more atoms that can form cations 104 when bonded to the one or more ionene units 100 (e.g., either directly to the molecular backbone 102 and/or via bonding with one or more hydrophobics functional groups 106) described herein. For example, the one or more hydrophilic functional groups 202 (e.g., represented by "$A_1$" in FIG. 2) can comprise one or more free radicals that can facilitate alkylation and/or quaternization to form the structure characterized by chemical formula 200. At one or more locations in which the hydrophilic functional group 202 is bonded to a hydrophobic functional group 106, a free radical of the hydrophilic functional group 202 can be ionized to form a cation 104. For example, wherein the hydrophilic functional group 202 is bonded to two hydrophobic functional groups 106 (e.g., as characterized by chemical formula 200 and shown in FIG. 2), the hydrophilic functional group 202 can comprise two cations 104. Thus, in various embodiments, the one or more hydrophilic functional groups 202 can contribute additional ions (e.g., one or more additional cations 104) to the ionene unit 100.

Example, free radicals that can comprise the hydrophilic functional group 202 can include, but are not limited to: nitrogen atoms, phosphorus atoms, oxygen atoms, a combination thereof, and/or the like. For example, the one or more hydrophilic functional groups 202 can be derived from a polyol that has carbohydrate mimetic functionality and comprises one or more free radicals. For instance, the one or more hydrophilic functional groups 202 can be derived from N-methyldiethanolamine, N,N,N,N-tetrakis(2-hydroxyethyl)ethylenediamine, Bis(2-dimethylaminoethyl)ether, a combination thereof, and/or the like.

Moreover, an ionene and/or polyionene characterized by chemical formula 200 can comprise a single ionene unit 100 or a repeating ionene unit 100. For example, the "n" shown in FIG. 2 can represent a first integer greater than or equal to one and less then or equal to one thousand. Further, the "m" shown in FIG. 2 can represent a second integer greater than or equal to one and less than or equal to one thousand. Thus, an ionene unit 100 characterized by chemical formula 200 can form monomers and/or polymers (e.g., alternating copolymers and/or random copolymers).

Figure 3:
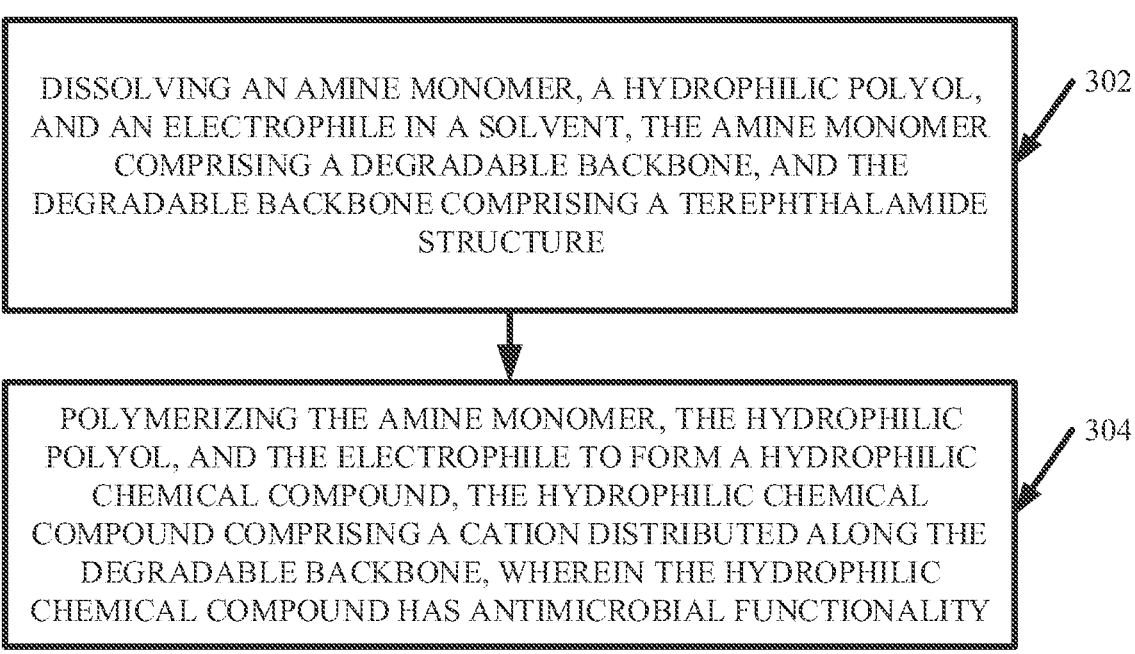
FIG. 3 illustrates a flow diagram of an example, non-limiting method that can facilitate generating one or more ionene and/or polyionene compositions in accordance with one or more embodiments described herein.

FIG. 3 illustrates a flow diagram of an example, non-limiting method 300 that can facilitate generating one or more ionene units 100 (e.g., characterized by chemical formula 200) in accordance with the one or more embodiments described herein. Repetitive description of like elements employed in other embodiments described herein is omitted for sake of brevity.

At 302, the method 300 can comprise dissolving one or more amine monomers, one or more hydrophilic polyols, and/or one or more electrophiles in a solvent. The reactants can be dissolved simultaneously and/or sequentially. For example, an amount of the one or more hydrophilic polyols that can be dissolved at 302 can be greater than or equal to 5 molar percent of the one or more amine monomers and less than or equal to 95 molar percent of the one or more amine monomers. The one or more amine monomers can comprise a degradable molecular backbone 102 that has one or more terepthalamide structures (e.g., as characterized by chemical formula 200). The one or more degradable amine monomers can further comprise a structure selected from a group that can include, but is not limited to: alkyl amine groups, hetero cyclic amine groups, a combination thereof, and/or the like. Moreover, in one or more embodiments the one or more amine monomers can be degradable tetra-amine monomers.

The one or more electrophiles can comprise, for example, one or more alkyl halides (e.g., dialkyl halides). For instance, the one or more electrophiles can comprise one or more dialkyl halides having chloride and/or bromide. Example electrophiles can include, but are not are not limited to: p-xylylene dichloride, 4,4'-bis(chloromethyl)biphenyl, 1,4-bis(bromomethyl)benzene, 4,4'-bis(bromomethyl)biphenyl, 1,4-bis(iodomethyl)benzene; 1,6-dibromohexane; 1,8-dibromooctane; 1,12-dibromododecane; 1,6-dichlorohexane; 1,8-dichlorooctane, a combination thereof, and/or the like.

The solvent can be an organic solvent. Additionally, the solvent can be an aprotic solvent, a dipolar solvent, and/or an alcohol. Example solvents can include but are not limited to: dimethyl formamide ("DMF"), methanol, a combination thereof, and/or the like. For example, DMF can be used as the solvent as it can dissolve the reactants at elevated temperatures. In one or more embodiments, equimolar amounts of the one or more amine monomers, the one or more hydrophilic polyols, and the one or more electrophiles can be dissolved in the solvent.

In one or more embodiments, the one or more amine monomers can be prepared through an aminolysis of PET. For example, PET can be depolymerized with one or more aminolysis reagents. The one or more aminolysis reagents can be diamines. A first amino group of the diamines can include, but are not limited to, a primary amino group and a secondary amino group. Also, a second amino group of the diamines can include, but are not limited to: a primary amino group, a secondary amino group, a tertiary amino group, and/or an imidazole group. For example, in one or more embodiments the secondary amino group can be a tertiary amino group and/or an imidazole group.

Scheme 1, presented below, demonstrates three exemplary, non-liming degradable amine monomers that can be prepared through aminolysis of PET.

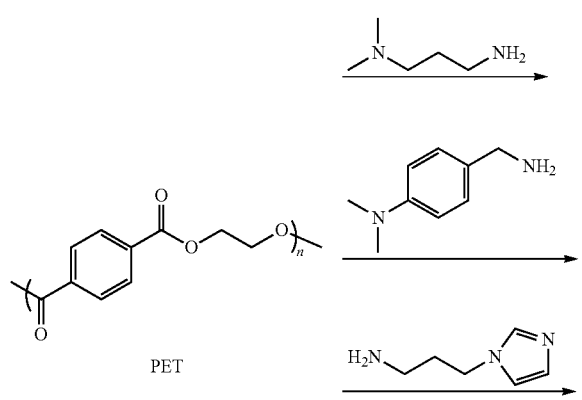

Preparation of the plurality of degradable amine monomers (e.g., in accordance with Scheme 1) can be performed without the need of a catalyst and/or a solvent. Further, aminolysis of PET can be performed with an excess of the aminolysis reagents (e.g., four times excess of the aminolysis reagents). Moreover, the aminolysis can depolymerize PET at elevated temperatures. Upon cooling, the target degradable amine monomers can be crystalized from the excess reagent and an alcohol side product (e.g., ethylene glycol). The degradable amine monomers can then be filtered, rinsed (e.g., with ethylacetate), and used without need for further purification.

While Scheme 1 depicts three example degradable amine monomers derived from PET, other degradable amine monomers that can be derived from PET are also envisaged. For example, PET can be depolymerized with aminolysis reagents other than the three depicted in Scheme 1. For instance, any aminolysis reagent having a primary amino group and/or a secondary amino group, which can donate a hydrogen atom to facilitate bonding to the terephthalate structure, and a second amino group and/or imidazole group, which can later become a cation 104, can be polymerized with PET to prepare a degradable amine monomer for use at 402. Further, the prepared degradable amine monomers derived from PET, as described herein, can comprise the plurality of amine monomers that can be utilized in method 300.

Additionally, in one or more embodiments the one or more amine monomers utilized in conjunction with the method 300 can be derived from a molecule other than PET. One of ordinary skill in the art can readily recognize that a plethora of other starting molecules can be polymerized and/or depolymerized to prepare the plurality of amine monomers (e.g., which can have degradable backbones, can comprise one or more terephthalamide structures, and/or can be a tetra-amine) that can be utilized in conjunction with the methods described herein (e.g., method 300).

The one or more hydrophilic polyols can have carbohydrate mimetic functionality and/or comprise one or more free radicals. Example, free radicals that can comprise the hydrophilic polyols can include, but are not limited to: nitrogen atoms, phosphorus atoms, oxygen atoms, a combination thereof, and/or the like. Example hydrophilic polyols can include, but are not limited to: N-methyldiethanolamine, N,N,N,N-tetrakis(2-hydroxyethyl)

ethylenediamine, Bis(2-dimethylaminoethyl)ether, a combination thereof, and/or the like. Additionally, the one or more hydrophilic polyols can be water soluble.

To facilitate the dissolving, the method 300 can further comprise stirring the one or more amine monomers, the one or more hydrophilic polyols, the one or more electrophiles, and the solvent at a temperature greater than or equal to 15 degrees Celsius (° C.) and less than or equal to 150° C. for a period of time greater than or equal to 8 hours and less than or equal to 72 hours (e.g., greater than or equal to 12 hours and less than or equal to 24 hours).

In one or more embodiments, the one or more hydrophilic polyols and/or the one or more electrophiles can be the same molecule. The molecule can be both an electrophile and a hydrophilic polyol. For example, the molecule can comprise a dialkyl halide structure and a plurality of hydroxyl groups. For instance, 2,2-Bis(bromomethyl)-1,3-propanediol is an example of a molecule that can be both an electrophile and a hydrophilic polyol. Thus, 302 can comprise dissolving one or more amine monomers and one or more molecules that are both hydrophilic polyols and electrophiles in a solvent.

At 304, the method 300 can comprise polymerizing (e.g., copolymerizing) the one or more degradable amine monomers, the one or more hydrophilic polyols, and/or the one or more electrophiles to form a hydrophilic monomer and/or polymer (e.g., an alternating copolymer and/or random copolymer). The hydrophilic polymer can comprise an ionene unit 100 (e.g., characterized by chemical formula 200) that can comprise a cation 104 distributed along a degradable molecular backbone 102. The molecular backbone 102 can comprise one or more terephthalamide structures (e.g., as illustrated in chemical formula 200). Further, the ionene unit 100 formed at 304 can have antimicrobial functionality and/or carbohydrate mimetic functionality. In one or more embodiments, the polymerizing at 304 can be performed under nitrogen gas. Additionally, the polymerizing at 304 can generate one or more cations 104 through alkylation and/or quaternation with the one or more electrophiles and/or one or more hydrophilic polyols. In various embodiments, the one or more terephthalamide structures comprising the precipitate can be derived from the PET that was depolymerized to prepare a plurality of degradable amine monomers.

The polymerization at 304 can further comprise an alkylation process and/or a quaternization process. The one or more amine monomers can comprise one or more atoms that can be subject to alkylation and/or quaternization with an electrophile to form a cation 104 bonded to a hydrophobic functional group 106 (e.g., as characterized by chemical formula 200). Also, the one or hydrophilic polyols can comprise one or more atoms (e.g., free radicals) that can be subject to alkylation and/or quaternization with a hydrophobic functional group 106 to form a hydrophilic functional group 202 bonded to the hydrophobic functional group 106 (e.g., as characterized by chemical formula 200). Additionally, a hydrophilic functional group 202 can comprise one or more atoms (e.g., free radicals) that can be subject to alkylation and/or quaternization with an electrophile and/or another hydrophobic functional group to form a cation 104 bonding the hydrophilic functional group 202 to an additional hydrophobic functional group 106 (e.g., a hydrophobic functional group 106 not bonded directly to the subject molecular backbone 102).

In one or more embodiments, wherein one or more molecules that can be both an electrophile and a hydrophilic polyol is dissolved at 302, the polymerization at 304 can comprise an alkylation and/or quaternization of one or more atoms comprising a molecular backbone 102 of an amine monomer with said molecule. Thus, a hydrophobic functional group 106 and a hydrophilic functional group 202 can be formed simultaneously by bonding the molecule to the molecular backbone 102 of an amine monomer, wherein the molecule can be both an electrophile and a polyol.

Further, one or more of the alkylation processes and/or one or more of the quaternization process can occur simultaneously. For example, alkylation and/or quaternization of a molecular backbone 102 with an electrophile (e.g., thereby forming a hydrophobic functional group 106) can occur simultaneous with an alkylation and/or quaternization of the electrophile with a hydrophilic polyol (e.g., thereby forming a hydrophilic functional group 202). Moreover, one or more cations 104 can be formed via an alkylation process at 304 while one or more other cations 104 can be formed via a quaternization process at 304. Thus, the polymerization at 304 (e.g., copolymerizing) can conduct a polymer-forming reaction (e.g., formation of the ionene unit 100) and an installation of charge (e.g., forming one or more cations 104, including a nitrogen cation and/or a phosphorus cation) simultaneously without a need of a catalyst.

For example, the ionene formed at 304 can comprise one or more embodiments of the ionene unit 100 and can be characterized by one or more embodiments of chemical formula 200. For instance, the ionene unit 100 formed at 304 can comprise a degradable molecular backbone 102 that can comprise one or more cations 104 (e.g., represented by "X" in chemical formula 200), one or more linkage groups (e.g., represented by "L" in chemical formula 200), one or more terephthalamide structures (e.g., as shown in FIG. 2), one or more hydrophobic functional groups 106 (e.g., represented by "R" in chemical formula 200), and/or one or more hydrophilic functional groups 202 (e.g., represented by "$A_1$" in chemical formula 200). The one or more cations 104 can be nitrogen cations (e.g., quaternary ammonium cations, imidazolium cations, and/or a combination thereof) and/or phosphorus cations (e.g., quaternary phosphonium cations). The cations 104 can be linked to the one or more terephthalamide structures via one or more linkage groups (e.g., alkyl groups and/or aryl groups). The one or more of the cations 104 can be bonded to one or more of the hydrophobic functional groups 106. Further, the one or more hydrophobic functional groups 106 can be bonded to one or more hydrophilic functional groups 202. Moreover, one or more additional hydrophobic functional groups 106 (e.g., not directly bonded to the subject molecular backbone 102) can be bonded to the hydrophilic functional group 202. Additionally, the ionene unit 100 formed at 304 can comprise repeating segments, as indicated by "n" and "m" in chemical formula 200 (e.g., shown in FIG. 2).

Figure 4A:
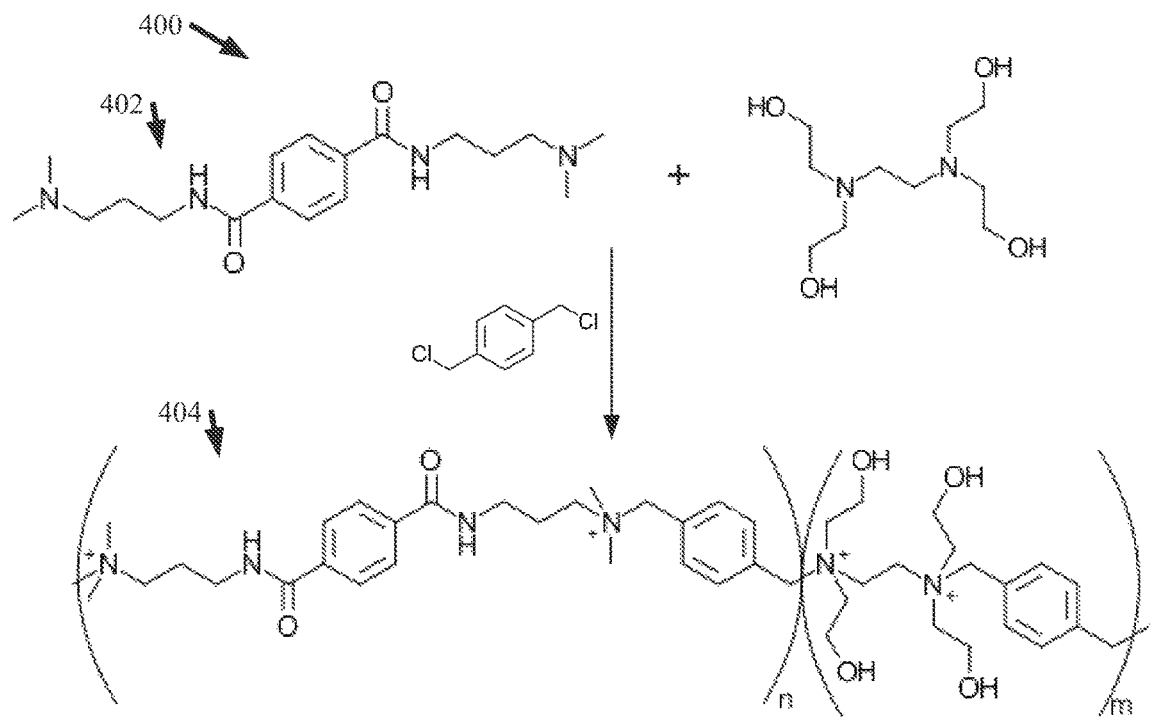
FIG. 4A illustrates a diagram of an example, non-limiting scheme that can facilitate forming an ionene and/or polyionene composition in accordance with one or more embodiments described herein.

FIG. 4A illustrates a diagram of an example, non-limiting scheme 400 that can depict a polymerization (e.g., a copolymerization) of one or more ionene units 100 (e.g., characterized by chemical formula 200) in accordance with one or more of the methods (e.g., method 300) described herein. Repetitive description of like elements employed in other embodiments described herein is omitted for sake of brevity. In scheme 400, "n" can represent a first integer greater than or equal to one and less than or equal to one thousand. Also, "m" can represent a second integer greater than or equal to one and less than or equal to one thousand. Additionally, the amine monomer reactant 402 can be a degradable tetraamine monomer comprising one or more terephthalamide structures that can be derived from PET in accordance with the various embodiments described herein (e.g., Scheme 1).

In one or more other embodiments, the amine monomer reactant 402 can be derived from a molecular other than PET.

Scheme 400 can depict a polymerization (e.g., a copolymerization) that can form a first polymer composition 404 (e.g., a copolymer comprising an ionene unit 100 that can be characterized by chemical formula 200 and/or generated by method 300). The polymerization can form the first polymer composition 404 by polymerizing the amine monomer reactant 402 (e.g., derived from aminolysis of PET) with N,N,N,N-tetrakis(2-hydroxyethyl)ethylenediamine and p-xylene dichloride. The polymerization can simultaneously form the structure of the first polymer composition 404 and positively charge the first polymer composition 404 (e.g., by generating the plurality of quaternary ammonium cations) through quaternization of: the amine monomer reactant's 402 tertiary amino groups distributed along the amine monomer reactant's 402 degradable backbone (e.g., molecular backbone 102); and/or the hydrophilic polyol's (e.g., N,N,N,N-tetrakis(2-hydroxyethyl)ethylenediamine) tertiary amino groups.

Figure 4B:
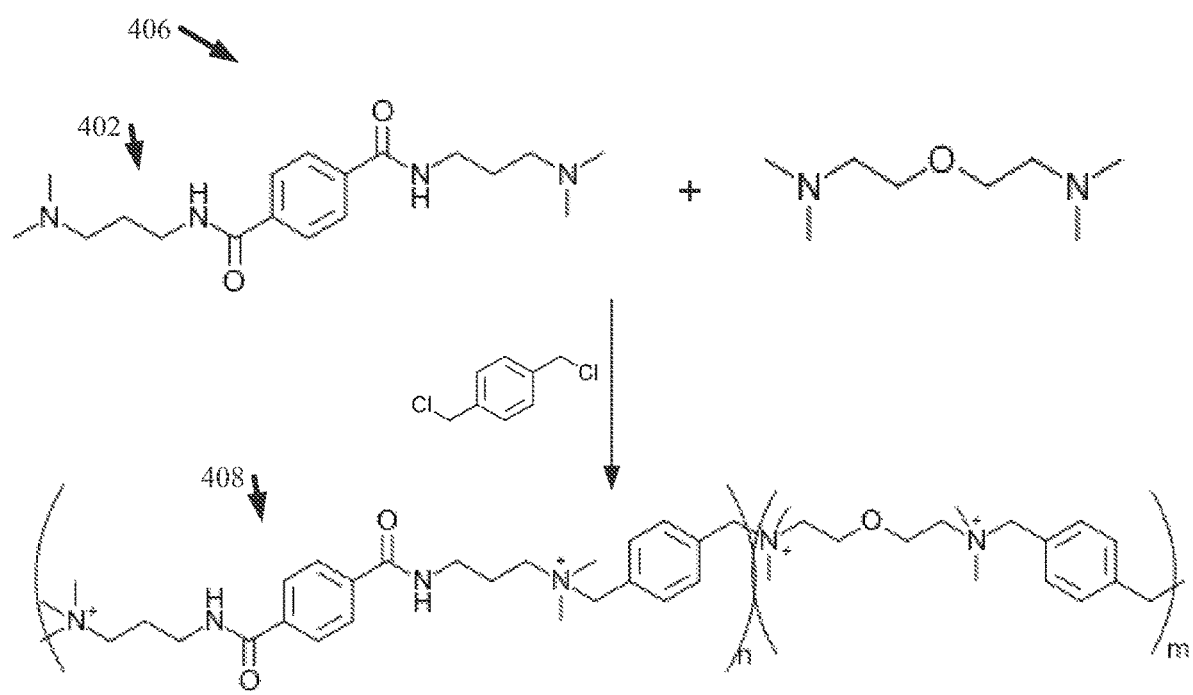
FIG. 4B illustrates a diagram of an example, non-limiting scheme that can facilitate forming an ionene and/or polyionene composition in accordance with one or more embodiments described herein.

FIG. 4B illustrates another diagram of an example, non-limiting scheme 406 that can depict a polymerization (e.g., a copolymerization) of one or more ionene units 100 (e.g., characterized by chemical formula 200) in accordance with one or more of the methods (e.g., method 300) described herein. Repetitive description of like elements employed in other embodiments described herein is omitted for sake of brevity. In scheme 406, "n" can represent a first integer greater than or equal to one and less than or equal to one thousand. Also, "m" can represent a second integer greater than or equal to one and less than or equal to one thousand. Additionally, the amine monomer reactant 402 can be a degradable tetra-amine monomer comprising one or more terephthalamide structures that can be derived from PET in accordance with the various embodiments described herein (e.g., Scheme 1). In one or more other embodiments, the amine monomer reactant 402 can be derived from a molecular other than PET.

Scheme 406 can depict a polymerization (e.g., a copolymerization) that can form a second polymer composition 408 (e.g., a copolymer comprising an ionene unit 100 that can be characterized by chemical formula 200 and/or generated by method 300). The polymerization can form the second polymer composition 408 by polymerizing the amine monomer reactant 402 (e.g., derived from aminolysis of PET) with Bis(2-dimethylaminoethyl)ether and p-xylene dichloride. The polymerization can simultaneously form the structure of the second polymer composition 408 and positively charge the second polymer composition 408 (e.g., by generating the plurality of quaternary ammonium cations) through quaternization of: the amine monomer reactant's 402 tertiary amino groups distributed along the amine monomer reactant's 402 degradable backbone (e.g., molecular backbone 102); and/or the hydrophilic polyol's (e.g., Bis(2-dimethylaminoethyl)ether) tertiary amino groups.

Figure 5:
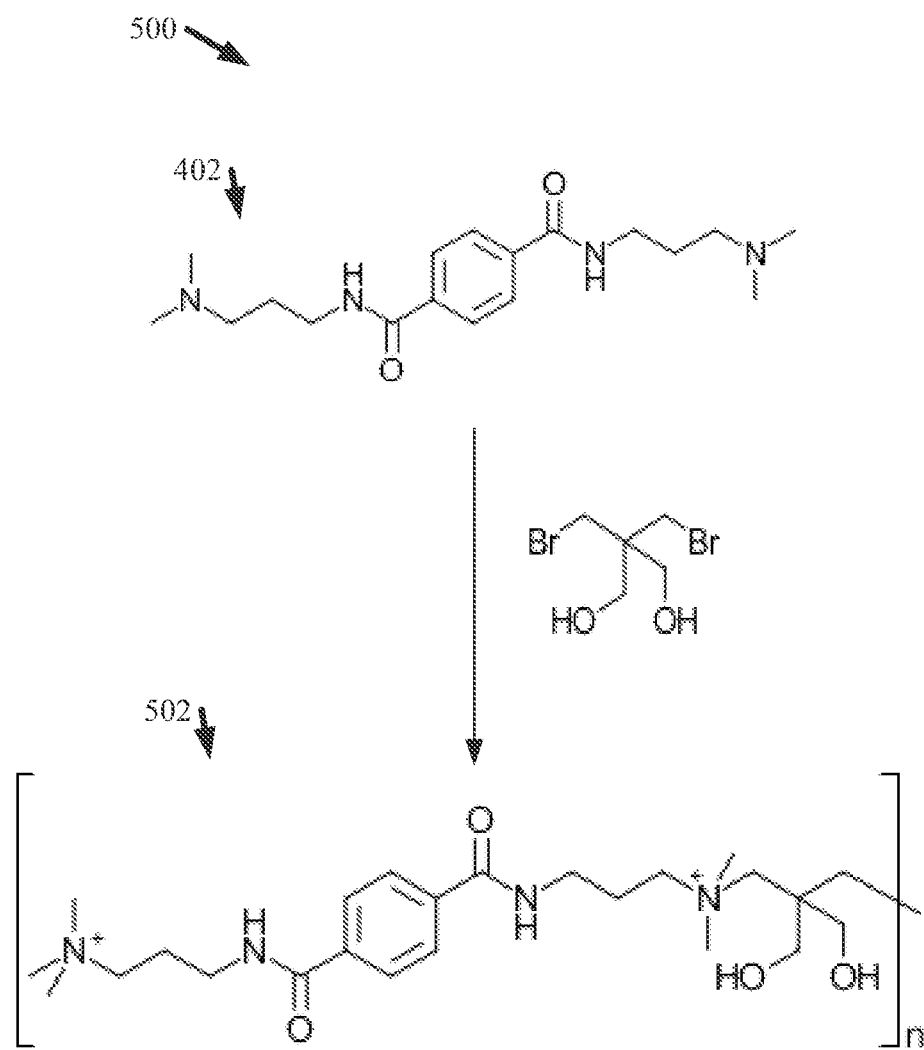
FIG. 5 illustrates a diagram of an example, non-limiting scheme that can facilitate forming an ionene and/or polyionene composition in accordance with one or more embodiments described herein.

FIG. 5 illustrates another diagram of an example, non-limiting scheme 500 that can depict a polymerization (e.g., a copolymerization) of one or more ionene units 100 (e.g., characterized by chemical formula 200) in accordance with one or more of the methods (e.g., method 300) described herein. Repetitive description of like elements employed in other embodiments described herein is omitted for sake of brevity. In scheme 500, "n" can represent a first integer greater than or equal to one and less than or equal to one thousand. Additionally, the amine monomer reactant 402 can be a degradable tetra-amine monomer comprising one or more terephthalamide structures that can be derived from PET in accordance with the various embodiments described herein (e.g., Scheme 1). In one or more other embodiments, the amine monomer reactant 402 can be derived from a molecular other than PET.

Scheme 500 can depict a polymerization (e.g., a copolymerization) that can form a third polymer composition 502 (e.g., a copolymer comprising an ionene unit 100 that can be characterized by chemical formula 200 and/or generated by method 300). The polymerization can form the third polymer composition 502 by polymerizing the amine monomer reactant 402 (e.g., derived from aminolysis of PET) with 2,2-Bis(bromomethyl)-1,3-propanediol. Here, a single molecule (e.g., 2,2-Bis(bromomethyl)-1,3-propanediol) can act as both an electrophile and a hydrophilic polyol. The polymerization can simultaneously form the structure of the third polymer composition 502 and positively charge the third polymer composition 502 (e.g., by generating the plurality of quaternary ammonium cations) through quaternization of the amine monomer reactant's 402 tertiary amino groups distributed along the amine monomer reactant's 402 degradable backbone (e.g., molecular backbone 102).

Figure 6:
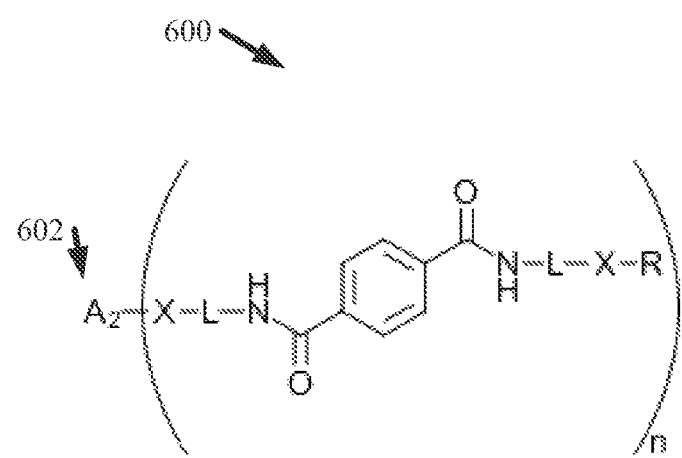
FIG. 6 illustrates a diagram of an example, non-limiting chemical formula that can characterize one or more ionene units in accordance with one or more embodiments described herein.

FIG. 6 illustrates a diagram of an example, non-limiting chemical formula 600 that can characterize the structure of an ionene unit 100 in accordance with one or more embodiments described herein. Repetitive description of like elements employed in other embodiments described herein is omitted for sake of brevity. In various embodiments, a plurality of ionene units 100 characterized by chemical formula 600 can be covalently bond together to form a polymer.

As shown in FIG. 6, an ionene unit 100 characterized by chemical formula 600 can comprise a degradable molecular backbone 102. Further, the degradable molecular backbone 102 can comprise one or more terephthalamide structures. In various embodiments, the ionene unit 100 characterized by chemical formula 600 can be derived from polyethylene terephthalate (PET), wherein the one or more terephthalamide structures can be derived from the PET. However, one or more embodiments of chemical formula 600 can comprise a degradable a terephthalamide structure derived from one or more molecules other than PET.

The "X" in FIG. 6 can represent the one or more cations 104. For example, "X" can represent one or more cations 104 selected from a group that can include, but is not limited to: one or more nitrogen cations, one or more phosphorus cations, and/or a combination thereof. For instance, "X" can represent one or more nitrogen cations selected from a group that can include, but is not limited to: one or more protonated secondary amine cations, one or more protonated tertiary amine cations, one or more quaternary ammonium cations, one or more imidazolium cations, and/or a combination thereof. In another instance, "X" can represent one or more phosphorus cations selected from a group that can include, but is not limited to: one or more protonated secondary phosphine cations, one or more protonated tertiary phosphine cations, one or more quaternary phosphonium cations, and/or a combination thereof.

The one or more cations 104 (e.g., represented by "X" in chemical formula 600) can be covalently bonded to one or more linkage groups to form, at least a portion, of the degradable molecular backbone 102. The one or more linkage groups can link the one or more cations 104 to the one or more terephthalamide structures, thereby comprising the molecular backbone 102. The "L" in FIG. 6 can represent the one or more linkage groups. The one or more linkage groups can comprise any structure in compliance with the various features of the molecular backbone 102 described herein. For example, the one or more linkage groups can have any desirable formation, including, but not limited to: chain formations, ring formations, and/or a combination thereof. The one or more linkage groups can comprise one or more chemical structures including, but not limited to: alkyl structures, aryl structures, alkenyl structures, aldehyde structures, ester structures, carboxyl structures, carbonyl structures, a combination thereof, and/or the like. For instance, "L" can represent one or more linkage groups that can comprise an alkyl chain having greater than or equal to two carbon atoms and less than or equal to 15 carbon atoms.

As shown in FIG. 6, in various embodiments, an ionene unit 100 characterized by chemical formula 600 can comprise cations 104 (e.g., represented by "X") at a plurality of locations along the molecular backbone 102. For example, cations 104 can be located at either end of the molecular backbone 102 (e.g., as illustrated in FIG. 6). However, in one or more embodiments of chemical formula 200, the molecular backbone 102 can comprise less or more cations 104 than the two illustrated in FIG. 6.

Further, the "R" shown in FIG. 6 can represent the one or more hydrophobic functional groups 106 in accordance with the various embodiments described herein. For example, the one or more hydrophobic functional groups 106 can comprise one or more alkyl groups and/or one or more aryl groups. For instance, the hydrophobic functional group 106 can be derived from a dialkyl halide. The one or more hydrophobic functional groups 106 (e.g., represented by "R" in FIG. 6) can be covalently bonded to one or more of the cations 104 (e.g., represented by "X" in FIG. 6) and/or the molecular backbone 102, which can comprise the one or more cations 104 (e.g., represented by "X" in FIG. 6), one or more linkage groups (e.g., represented by "L" in FIG. 6), and/or one or more terepthalamide structures.

Further, an ionene unit 100 (e.g., characterized by chemical formula 600) can comprise one or more second hydrophilic functional groups 602. As shown in FIG. 6, "$A_2$" can represent the second hydrophilic functional group 602. The one or more second hydrophilic functional groups 602 can comprise one or more ethers. Also, the one or more second hydrophilic functional groups 602 can be water-soluble. Further, the one or more second hydrophilic functional groups 602 can be bioinert. Moreover, the one or more second hydrophilic functional groups 602 can be derived from one or more block polymers (e.g., poly(ethylene-propylene oxide) copolymers and/or the like) comprising a water-soluble block. Additionally, one or more of the second hydrophilic functional groups 602 can comprise one or more carboxyl groups, one or more carbonyl groups, one or more ether groups, one or more ketone groups, a combination thereof, and/or the like. For example, the one or more second hydrophilic functional groups 602 can comprise a poly (ethylene glycol) ("PEG") structure, a poly(propylene glycol)-block-poly(ethylene glycol)-block-poly(propylene glycol) bis(2-aminopropyl ether) ("ED") structure, and/or the like.

The one or more second hydrophilic functional groups 602 can be covalently bonded to the molecular backbone 102 of the subject ionene unit 100. For example, as shown in FIG. 6, the one or more hydrophilic functional groups 602 can be bonded to a cation 104 of the molecular backbone 102. For instance, the ionene unit 100 can have a degradable molecular backbone 102 comprising a plurality of cations 104, wherein a first cation 104 can be bonded to the hydrophobic functional group 106, and one or more other cations 104 can be bonded to a second hydrophilic functional group 602. Further, in one or more embodiments, the second hydrophilic functional group 602 can bond to a second ionene unit 100 to form a polymer (e.g., an alternating copolymer and/or a random copolymer).

Moreover, an ionene and/or polyionene characterized by chemical formula 600 can comprise a single ionene unit 100 or a repeating ionene unit 100. For example, the "n" shown in FIG. 6 can represent a first integer greater than or equal to one and less then or equal to one thousand. Thus, an ionene unit 100 characterized by chemical formula 600 can form monomers and/or polymers.

FIG. 7 illustrates a flow diagram of an example, non-limiting method 700 that can facilitate generating one or more ionene units 100 (e.g., characterized by chemical formula 600) in accordance with the one or more embodiments described herein. Repetitive description of like elements employed in other embodiments described herein is omitted for sake of brevity.

At 702, the method 700 can comprise dissolving one or more amine monomers, one or more hydrophilic block polymers, and one or more electrophiles in a solvent. The reactants can be dissolved simultaneously and/or sequentially. For example, an amount of the one or more hydrophilic block polymer that can be dissolved at 702 can be greater than or equal to 2 molar percent of the one or more amine monomers and less than or equal to 20 molar percent of the one or more amine monomers. The one or more amine monomers can comprise a degradable molecular backbone 102 that has one or more terepthalamide structures (e.g., as characterized by chemical formula 600). The one or more degradable amine monomers can further comprise a structure selected from a group that can include, but is not limited to: alkyl amine groups, hetero cyclic amine groups, a combination thereof, and/or the like. Moreover, in one or more embodiments the one or more amine monomers can be degradable tetra-amine monomers.

The one or more electrophiles can comprise, for example, one or more alkyl halides (e.g., dialkyl halides). For instance, the one or more electrophiles can comprise one or more dialkyl halides having chloride and/or bromide. Example electrophiles can include, but are not are not limited to: p-xylylene dichloride, 4,4'-bis(chloromethyl)biphenyl, 1,4-bis(bromomethyl)benzene, 4,4'-bis(bromomethyl)biphenyl, 1,4-bis(iodomethyl)benzene; 1,6-dibromohexane; 1,8-dibromooctane; 1,12-dibromododecane; 1,6-dichlorohexane; 1,8-dichlorooctane, a combination thereof, and/or the like.

The solvent can be an organic solvent. Additionally, the solvent can be an aprotic solvent, a dipolar solvent, and/or an alcohol. Example solvents can include but are not limited to: DMF, methanol, a combination thereof, and/or the like. For example, DMF can be used as the solvent as it can dissolve the reactants at elevated temperatures. In one or more embodiments, equimolar amounts of the one or more amine monomers, the one or more hydrophilic polyols, and the one or more electrophiles can be dissolved in the solvent.

In one or more embodiments, the one or more amine monomers can be prepared through an aminolysis of PET. For example, PET can be depolymerized with one or more aminolysis reagents. The one or more aminolysis reagents can be diamines. A first amino group of the diamines can include, but are not limited to, a primary amino group and a secondary amino group. Also, a second amino group of the diamines can include, but are not limited to: a primary amino group, a secondary amino group, a tertiary amino group, and/or an imidazole group. For example, in one or more embodiments the secondary amino group can be a tertiary amino group and/or an imidazole group. The one or more amine monomers can be prepared in accordance with Scheme 1 described herein.

Preparation of the plurality of degradable amine monomers (e.g., in accordance with Scheme 1) can be performed without the need of a catalyst and/or a solvent. Further, aminolysis of PET can be performed with an excess of the aminolysis reagents (e.g., four times excess of the aminolysis reagents). Moreover, the aminolysis can depolymerize PET at elevated temperatures. Upon cooling, the target degradable amine monomers can be crystalized from the excess reagent and an alcohol side product (e.g., ethylene glycol). The degradable amine monomers can then be filtered, rinsed (e.g., with ethylacetate), and used without need for further purification.

While Scheme 1 depicts three example degradable amine monomers derived from PET, other degradable amine monomers that can be derived from PET are also envisaged. For example, PET can be depolymerized with aminolysis reagents other than the three depicted in Scheme 1. For instance, any aminolysis reagent having a primary amino group and/or a secondary amino group, which can donate a hydrogen atom to facilitate bonding to the terephthalate structure, and a second amino group and/or imidazole group, which can later become a cation 104, can be polymerized with PET to prepare a degradable amine monomer for use at 402. Further, the prepared degradable amine monomers derived from PET, as described herein, can comprise the plurality of amine monomers that can be utilized in method 700.

Additionally, in one or more embodiments the one or more amine monomers utilized in conjunction with the method 300 can be derived from a molecule other than PET. One of ordinary skill in the art can readily recognize that a plethora of other starting molecules can be polymerized and/or depolymerized to prepare the plurality of amine monomers (e.g., which can have degradable backbones, can comprise a terephthalamide structure, and/or can be a tetraamine) that can be utilized in conjunction with the methods described herein (e.g., method 300).

The one or more hydrophilic block polymers can comprise one or more ether groups, a water-soluble block, and/or be bioinert. The one or more hydrophilic block polymers can comprise one more PEG structures, one or more ED structures, a combination thereof, and/or the like. For example, the one or more PEG structures and/or the one or more ED structures can have a molecular weight greater than or equal to 500 grams per mole (g/mol) and less than or equal to 3500 g/mol (e.g., greater than or equal to 1900 g/mol and less than or equal to 2200 g/mol). Further, the one or more hydrophilic block polymers can be functionalized with one or more alkyl halides and/or dialkyl halides. Additionally, the one or more hydrophilic block polymers can comprise one or more carbonyl groups.

To facilitate the dissolving, the method 300 can further comprise stirring the one or more amine monomers, the one or more hydrophilic block polymers, the one or more electrophiles, and the solvent at a temperature greater than or equal to 15° C. and less than or equal to 150° C. for a period of time greater than or equal to 8 hours and less than or equal to 72 hours (e.g., greater than or equal to 12 hours and less than or equal to 24 hours).

At 704, the method 700 can comprise polymerizing (e.g., copolymerizing) the one or more degradable amine monomers, the one or more hydrophilic block polymers, and/or the one or more electrophiles to form a hydrophilic polymer (e.g., an alternating copolymer and/or random copolymer). The hydrophilic polymer can comprise an ionene unit 100 (e.g., characterized by chemical formula 600) that can comprise a cation 104 distributed along a degradable molecular backbone 102. The molecular backbone 102 can comprise one or more terephthalamide structures (e.g., as illustrated in chemical formula 600). Further, the ionene unit 100 formed at 604 can have antimicrobial functionality and/or enhanced hydrophilicity. In one or more embodiments, the polymerizing at 704 can be performed under nitrogen gas. Additionally, the polymerizing at 704 can generate one or more cations 104 through alkylation and/or quaternation with the one or more electrophiles and/or one or more hydrophilic block polymers. In various embodiments, the one or more terephthalamide structures comprising the precipitate can be derived from the PET that was depolymerized to prepare a plurality of degradable amine monomers.

The polymerization at 704 can further comprise an alkylation process and/or a quaternization process. The one or more amine monomers can comprise one or more atoms (e.g., comprising the molecular backbone 102) that can be subject to alkylation and/or quaternization with an electrophile to form a cation 104 bonded to a hydrophobic functional group 106 (e.g., as characterized by chemical formula 600). Additionally, the subject amine monomer can comprise another atom (e.g., comprising the molecular backbone 102) that can be subject to alkylation and/or quaternization with a hydrophilic block polymer to form a cation 104 bonded to a second hydrophilic functional group 602 (e.g., as characterized by chemical formula 600).

Further, one or more of the alkylation processes and/or one or more of the quaternization process can occur simultaneously. For example, alkylation and/or quaternization of a molecular backbone 102 with an electrophile (e.g., thereby forming a hydrophobic functional group 106) can occur simultaneous with an alkylation and/or quaternization of the electrophile with a hydrophilic block polymer (e.g., thereby forming a second hydrophilic functional group 602). Moreover, one or more cations 104 can be formed via an alkylation process at 704 while one or more other cations 104 can be formed via a quaternization process at 704. Thus, the polymerization at 704 (e.g., copolymerizing) can conduct a polymer-forming reaction (e.g., formation of the ionene unit 100) and an installation of charge (e.g., forming one or more cations 104, including a nitrogen cation and/or a phosphorus cation) simultaneously without a need of a catalyst.

For example, the ionene formed at 704 can comprise one or more embodiments of the ionene unit 100 and can be characterized by one or more embodiments of chemical formula 600. For instance, the ionene unit 100 formed at 704 can comprise a degradable molecular backbone 102 that can comprise one or more cations 104 (e.g., represented by "X" in chemical formula 600), one or more linkage groups (e.g., represented by "L" in chemical formula 600), one or more terephthalamide structures (e.g., as shown in FIG. 6), one or more hydrophobic functional groups 106 (e.g., represented by "R" in chemical formula 600), and/or one or more second hydrophilic functional groups 602 (e.g., represented by "$A_2$" in chemical formula 600). The one or more cations 104 can be nitrogen cations (e.g., quaternary ammonium cations, imidazolium cations, and/or a combination thereof) and/or phosphorus cations (e.g., quaternary phosphonium cations). The cations 104 can be linked to the one or more terephthalamide structures via one or more linkage groups (e.g., alkyl groups and/or aryl groups). The one or more of the cations 104 can be bonded to one or more of the hydrophobic functional groups 106. Also, one or more of the cations 104 can be bonded to one or more of the second hydrophilic functional groups 602. Additionally, the hydrophilic polymer (e.g., ionene unit 100) formed at 704 can comprise a repeating segments, as indicated by "n" in chemical formula 600 (e.g., shown in FIG. 6), wherein "n" can be an integer greater than or equal to one and less than or equal to one thousand.

Antimicrobial activity of the ionene units 100 generated by the methods described herein (e.g., method 300 and/or method 700) can be independent of molecular weight. Thus, the methods (e.g., method 300 and/or method 700) can target polymerization conditions that can extinguish molecular weight attainment by diffusion limited mechanism (e.g., polymer precipitation) to modest molecular weights (e.g., molecular weights less than 10,000 daltons), which can aid in the solubility of the ionene units 100 in aqueous media.

Figure 8A:
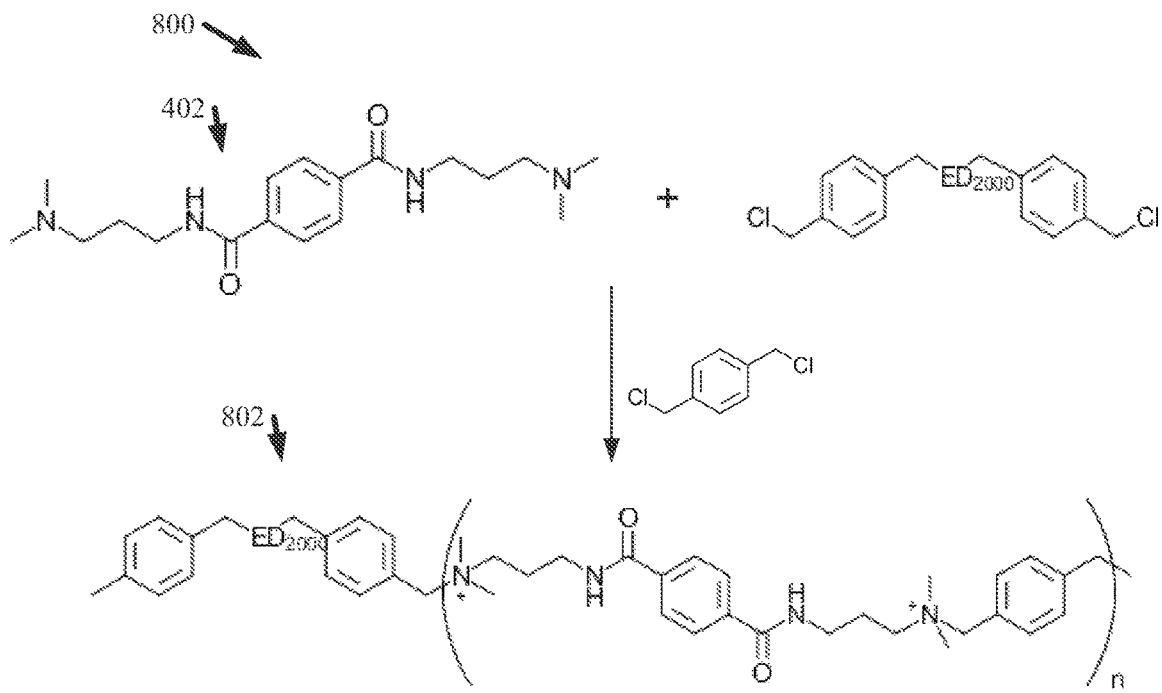
FIG. 8A illustrates a diagram of an example, non-limiting scheme that can facilitate forming an ionene and/or polyionene composition in accordance with one or more embodiments described herein.

FIG. 8A illustrates a diagram of an example, non-limiting scheme 800 that can depict a polymerization (e.g., a copolymerization) of one or more ionene units 100 (e.g., characterized by chemical formula 600) in accordance with one or more of the methods (e.g., method 600) described herein. Repetitive description of like elements employed in other embodiments described herein is omitted for sake of brevity. In scheme 800, "n" can represent a first integer greater than or equal to one and less than or equal to one thousand. Additionally, the amine monomer reactant 402 can be a degradable tetra-amine monomer comprising one or more terephthalamide structures that can be derived from PET in accordance with the various embodiments described herein (e.g., Scheme 1). In one or more other embodiments, the amine monomer reactant 402 can be derived from a molecular other than PET.

Scheme 800 can depict a polymerization (e.g., a copolymerization) that can form a fourth polymer composition 802 (e.g., a copolymer comprising an ionene unit 100 that can be characterized by chemical formula 600 and/or generated by method 700). The polymerization can form the fourth polymer composition 802 by polymerizing the amine monomer reactant 402 (e.g., derived from aminolysis of PET) with a functionalized ED derivative (e.g., having a molecular weight greater than or equal to 1900 g/mol and less than or equal to 2200 g/mol) and p-xylylene dichloride. The polymerization can simultaneously form the structure of the fourth polymer composition 802 and positively charge the fourth polymer composition 802 (e.g., by generating the plurality of quaternary ammonium cations) through quaternization of the amine monomer reactant's 402 tertiary amino groups distributed along the amine monomer reactant's 402 degradable backbone (e.g., by the electrophile and/or the hydrophilic block polymer).

Figure 8B:
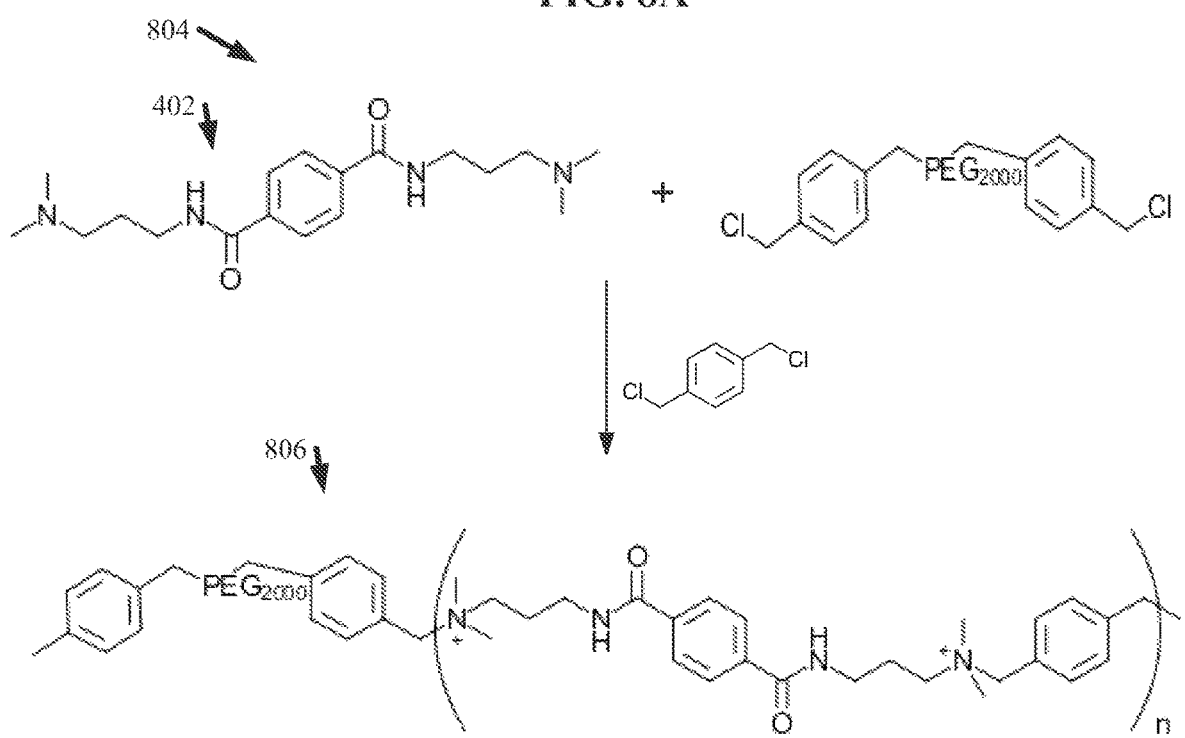
FIG. 8B illustrates a diagram of an example, non-limiting scheme that can facilitate forming an ionene and/or polyionene composition in accordance with one or more embodiments described herein.

FIG. 8B illustrates another diagram of an example, non-limiting scheme 804 that can depict a polymerization (e.g., a copolymerization) of one or more ionene units 100 (e.g., characterized by chemical formula 600) in accordance with one or more of the methods (e.g., method 700) described herein. Repetitive description of like elements employed in other embodiments described herein is omitted for sake of brevity. In scheme 804, "n" can represent a first integer greater than or equal to one and less than or equal to one thousand. Additionally, the amine monomer reactant 402 can be a degradable tetra-amine monomer comprising one or more terephthalamide structures that can be derived from PET in accordance with the various embodiments described herein (e.g., Scheme 1). In one or more other embodiments, the amine monomer reactant 402 can be derived from a molecular other than PET.

Scheme 804 can depict a polymerization (e.g., a copolymerization) that can form a fifth polymer composition 806 (e.g., a copolymer comprising an ionene unit 100 that can be characterized by chemical formula 600 and/or generated by method 700). The polymerization can form the fifth polymer composition 806 by polymerizing the amine monomer reactant 402 (e.g., derived from aminolysis of PET) with a functionalized PEG derivative (e.g., having a molecular weight greater than or equal to 1900 g/mol and less than or equal to 2200 g/mol) and p-xylylene dichloride. The polymerization can simultaneously form the structure of the fifth polymer composition 806 and positively charge the fifth polymer composition 806 (e.g., by generating the plurality of quaternary ammonium cations) through quaternization of the amine monomer reactant's 402 tertiary amino groups distributed along the amine monomer reactant's 402 degradable backbone (e.g., by the electrophile and/or the hydrophilic block polymer).

FIG. 9 illustrates a diagram of an example, non-limiting chart 900 that can depict the antimicrobial efficacy of one or more polymer compositions in accordance with one or more embodiments described herein. Repetitive description of like elements employed in other embodiments described herein is omitted for sake of brevity. To demonstrate the antimicrobial effects of the polymers described herein (e.g., comprising ionene units 100 that can be: characterized by chemical formula 200 and/or chemical formula 600; generated by method 300 and/or method 700; and/or depicted in scheme 400, scheme 406, scheme 500, scheme 800 and/or scheme 804), a plurality of polymer compositions were evaluated against a broad spectrum of pathogens.

The first column 902 of chart 900 can depict the polymer composition subject to evaluation. The second column 904 of chart 900 can depict the minimum inhibitory concentration (MIC) in micrograms per milliliter (μg/mL) of the subject polymer composition regarding *Staphylococcus aureus* ("SA"). The third column 906 of chart 900 can depict the MIC in μg/mL of the subject polymer composition regarding *Escherichia coli* ("EC"). The fourth column 908 of chart 900 can depict the MIC in μg/mL of the subject polymer composition regarding *Pseudomonas aeruginosa* ("PA"). The fifth column 910 of chart 900 can depict the MIC in μg/mL of the subject polymer composition regarding *Candida albicans* ("CA"). The sixth column 912 of chart 900 can depict the concentrations of the subject polymer composition that lead to lysis of 50% of rat red blood cells ("HC$_{50}$") in μg/mL of the subject polymer composition regarding rat red blood cells. Chart 900 can demonstrate that the various embodiments described herein can describe and/or generate polymer compositions that have strong antimicrobial potency, negligible toxicity, and the potential ability to mitigate protein absorption.

Figure 10:
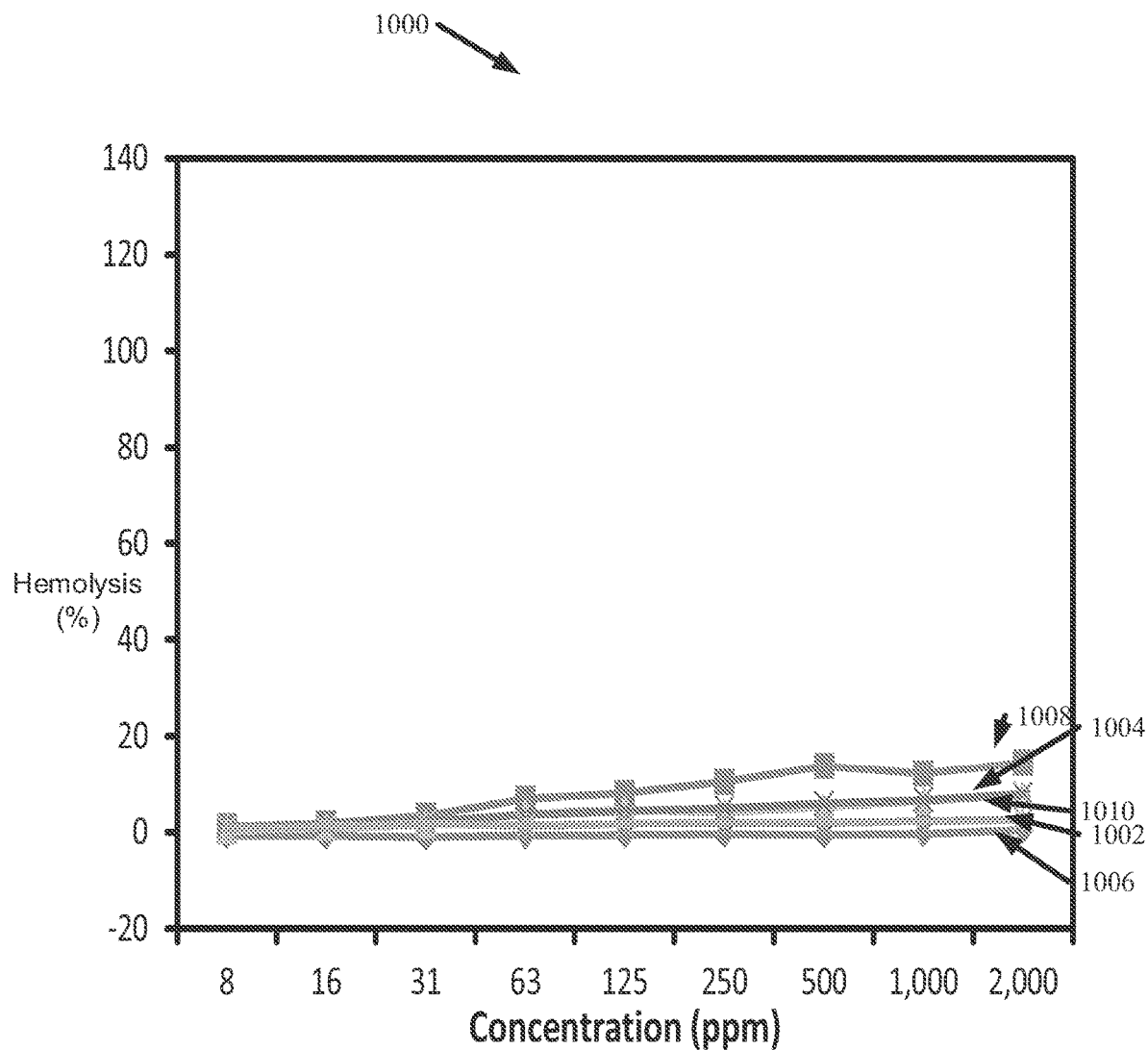
FIG. 10 illustrates a diagram of an example, non-limiting graph that can depict hemolysis activity of one or more polymer compositions in accordance with one or more embodiments described herein.

FIG. 10 illustrates a diagram of an example, non-limiting graph 1000 that can depict the hemolytic activity of various polymer compositions at various concentrations in accordance with the one or more embodiments described herein. Repetitive description of like elements employed in other embodiments described herein is omitted for sake of brevity. For example, FIG. 10 can show the hemolytic activity of the first polymer composition 404 via first line 1002, the second polymer composition 408 via second line 1004, the third polymer composition 502 via third line 1006, the fourth polymer composition 802 via fourth line 1008, and/or the fifth polymer composition 806 via fifth line 1010 at concentrations ranging from 8 parts per million (ppm) to 2000 ppm. The hemolytic activity depicted in graph 1000 can regard rat red blood cells. The second polymer composition 408 (represented by the second line 1004) can exhibit hemolytic activity that is very similar to the fifth polymer composition 806 (e.g., represented by fifth line 1010).

FIG. 11 illustrates another flow diagram of an example, non-limiting method 1100 of killing a pathogen, preventing the growth of a pathogen, and/or preventing contamination by a pathogen. Repetitive description of like elements employed in other embodiments described herein is omitted for sake of brevity. Example pathogens include, but are not limited to: Gram-negative bacteria, Gram-positive bacteria, fungi, yeast, a combination thereof, and/or the like.

At 1102, the method 1100 can comprise contacting the pathogen with a chemical compound (e.g., an ionene composition, a polyionene composition, a monomer, and/or a polymer). The chemical compound can comprise an ionene unit 100 (e.g., characterized by chemical formula 200 and/or by chemical formula 600). The ionene unit 100 can comprise a cation 104 (e.g., a nitrogen cation and/or a phosphorus cation) distributed along a degradable backbone (e.g., a molecular backbone 102) that can comprise one or more terephthalamide structures (e.g., derived from an aminolysis of PET). The ionene unit 100 can have antimicrobial functionality. The polymer can also comprise a hydrophilic functional group (e.g., hydrophilic functional group 202 and/or second hydrophilic functional group 602) covalently bonded to the ionene unit 100.

At 1104, the method 1100 can comprise electrostatically disrupting a membrane of the pathogen (e.g., via lysis process 108) upon contacting the pathogen with the chemical compound (e.g., an ionene unit 100 characterized by chemical formula 200 and/or chemical formula 600). Additionally, contacting the pathogen with the polymer (e.g., an ionene unit 100 characterized by chemical formula 200 and/or chemical formula 600) can disrupt the membrane through hydrophobic membrane integration (e.g., via lysis process 108).

The ionene that can comprise the polymer that contacts the pathogen at 1102 can comprise one or more embodiments of the ionene unit 100 and can be characterized by one or more embodiments of chemical formula 200 and/or chemical formula 600. For instance, the ionene unit 100 can comprise a degradable molecular backbone 102 that can comprise one or more cations 104 (e.g., represented by "X" in chemical formula 200 and/or chemical formula 600), one or more linkage groups (e.g., represented by "L" in chemical formula 200 and/or in chemical formula 600), one or more terephthalamide structures (e.g., as shown in FIG. 2 and/or FIG. 6), and/or one or more hydrophobic functional groups 106 (e.g., represented by "R" in chemical formula 200 and/or chemical formula 600). The one or more cations 104 can be nitrogen cations (e.g., quaternary ammonium cations, imidazolium cations, and/or a combination thereof) and/or phosphorus cations (e.g., quaternary phosphonium cations). The cations 104 can be linked to the one or more terephthalamide structures via one or more linkage groups (e.g., alkyl groups and/or aryl groups). Further, one or more of the cations 104 can be bonded to one or more of the hydrophobic functional groups 106.

In one or more embodiments, the ionene unit 100 can further be bonded to a hydrophilic functional group 202, which can comprise a plurality of hydroxyl groups and one or more additional cations 104 (e.g., as characterized by chemical formula 200). In some embodiments, the ionene unit 100 can further be bonded to a second hydrophilic functional group 602, which can comprise one or more ether groups and/or one or more carbonyl groups, that can be water-soluble and/or bioinert (e.g., as characterized by chemical formula 600). Therefore, the ionene unit 100 contacting the pathogen at 1102 can comprise any and all the features of the various embodiments described herein.

The various structures (e.g., described regarding FIGS. 1-2 and 6), compositions (e.g., described regarding FIGS. 4-5 and 8-10), and/or methods (e.g., described regarding FIGS. 3, 7, and 11) described herein can all regard chemical compounds that can be incorporated into a variety of applications. For example, said applications can include cleaning, sanitizing, disinfecting, and/or otherwise treating various articles such as, but not limited to: food packaging, medical devices, floor surfaces, furniture surfaces, wound care instruments (e.g., bandages and/or gauss), building surfaces, plants (e.g., agricultural crops), ground surfaces, farming equipment, beds, sheets, clothes, blankets, shoes, doors, door frames, walls, ceilings, mattresses, light fixtures, facets, switches, sinks, grab rails, remote controls, vanities, computer equipment, carts, trolleys, hampers, bins, a combination thereof, and/or the like. In another example, said applications can include pharmaceuticals, pharmaceutical salts, hygiene products (e.g., soaps and/or shampoos), and/or the like. In a further example, said applications can include agricultural sprays and/or aqueous solutions that can facilitate processing crops for consumption.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

What has been described above include mere examples of systems, compositions, and methods. It is, of course, not possible to describe every conceivable combination of reagents, products, solvents, and/or articles for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A polymer having a structure characterized by a formula selected from the group consisting of:

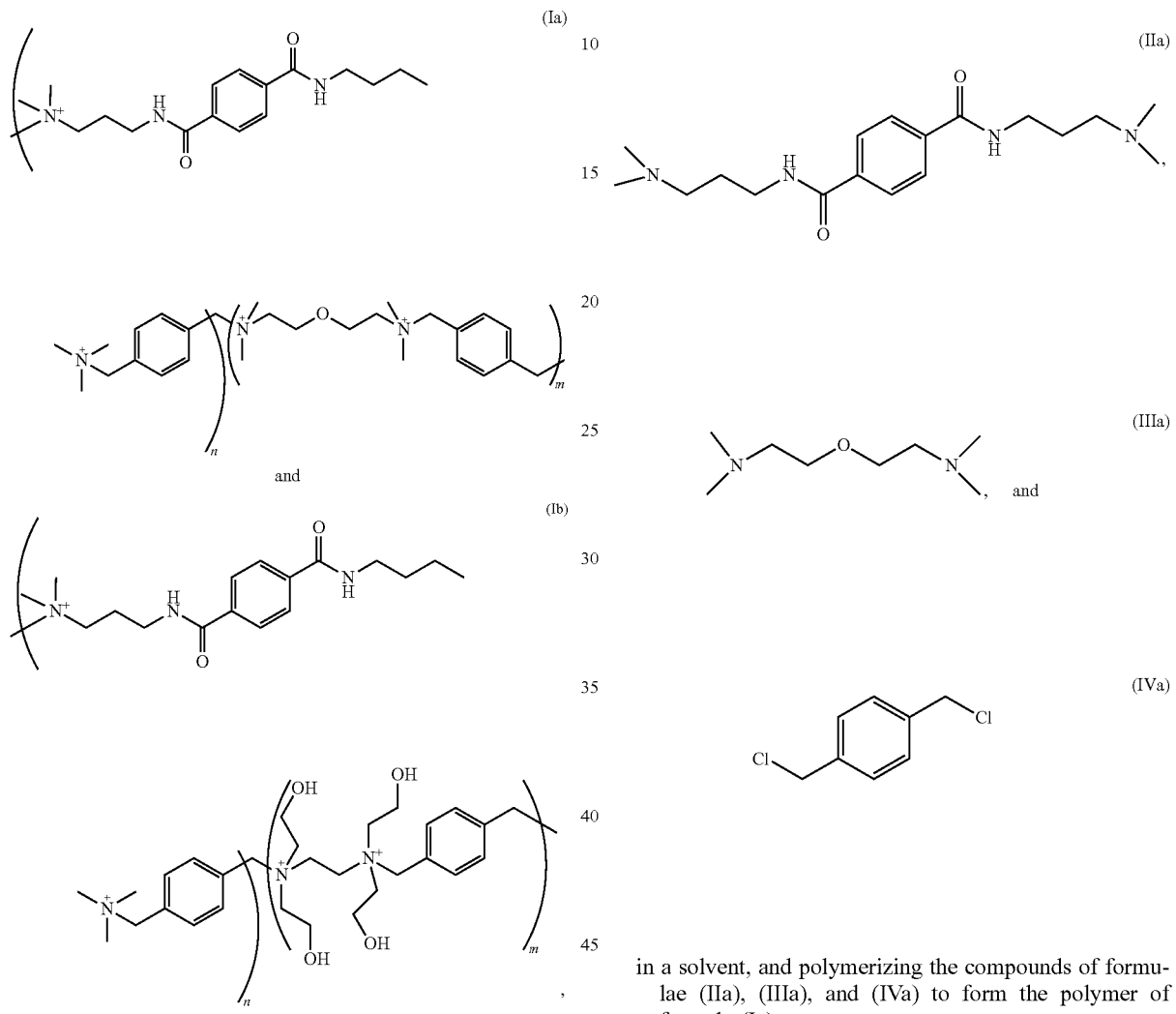

wherein n is a first integer greater than or equal to one and less than or equal to one thousand, and wherein m is a second integer greater than or equal to one and less than or equal to one thousand.

2. A method of making a polymer of formula (Ia):

wherein n is a first integer greater than or equal to one and less than or equal to one thousand, and wherein m is a second integer greater than or equal to one and less than or equal to one thousand;

the method comprising dissolving compounds of formulae (IIa), (IIIa), and (IVa)

in a solvent, and polymerizing the compounds of formulae (IIa), (IIIa), and (IVa) to form the polymer of formula (Ia).

3. The method of claim 2, further comprising stirring the compounds of formulae (IIa), (IIIa), (IVa), and the solvent at a temperature greater than or equal to 15° C. and less than or equal to 150° C. for a period of time greater than or equal to 12 hours and less than or equal to 24 hours.

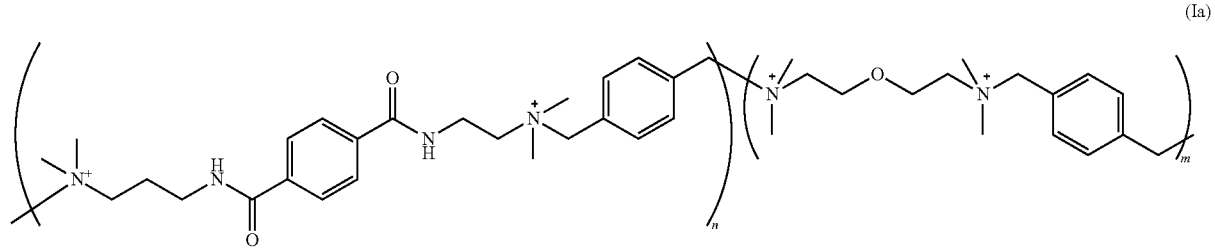

4. A method of making a polymer of formula (Ib):

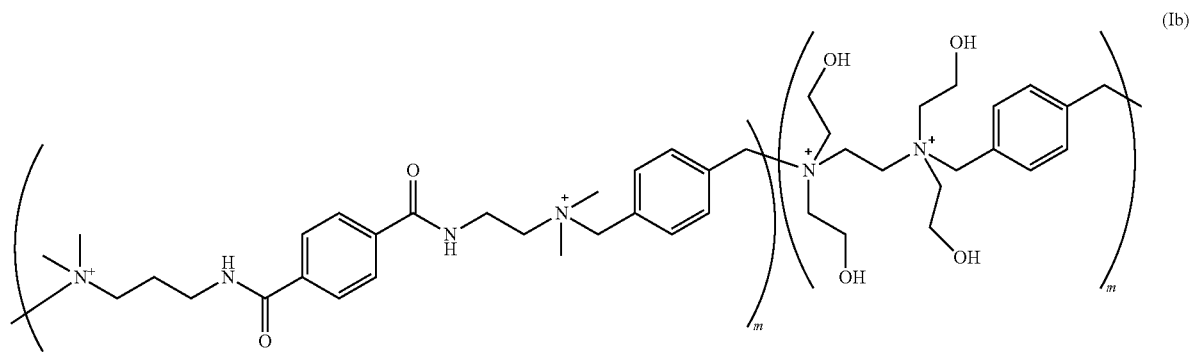

wherein n is a first integer greater than or equal to one and less than or equal to one thousand, and wherein m is a second integer greater than or equal to one and less than or equal to one thousand;

the method comprising dissolving compounds of formulae (IIb), (IIIb), and (IVb)

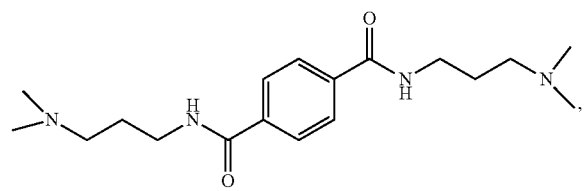

(IIb)

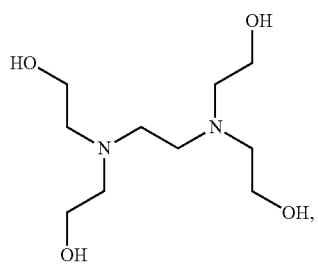

(IIIb)

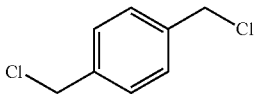

(IVb)

in a solvent, and polymerizing the compounds of formulae (IIb), (IIIb), and (IVb) to form the polymer of formula (Ib).

5. The method of claim 4, further comprising stirring the compounds of formulae (IIb), (IIIb), (IVb), and the solvent at a temperature greater than or equal to 15° C. and less than or equal to 150° C. for a period of time greater than or equal to 12 hours and less than or equal to 24 hours.

* * * * *